(12) United States Patent
Xie et al.

(10) Patent No.: US 8,446,840 B2
(45) Date of Patent: May 21, 2013

(54) TCP PROXY INSERTION AND UNINSTALL METHOD, AND SERVICE GATEWAY DEVICE

(71) Applicant: Huawei Technologies Co., Ltd, Guangdong (CN)

(72) Inventors: Huaguo Xie, Shenzhen (CN); Tong Zhou, Shenzhen (CN); Mingxia Wang, Shenzhen (CN); Jie Wu, Shenzhen (CN)

(73) Assignee: Hauwei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/689,277

(22) Filed: Nov. 29, 2012

(65) Prior Publication Data

US 2013/0083799 A1 Apr. 4, 2013

Related U.S. Application Data

(63) Continuation of application No. PCT/CN2011/079287, filed on Sep. 2, 2011.

(30) Foreign Application Priority Data

Feb. 28, 2011 (CN) .......................... 2011 1 0048376

(51) Int. Cl.
*H04L 12/12* (2006.01)
*H04L 12/58* (2006.01)

(52) U.S. Cl.
USPC ............ 370/252; 709/203; 709/228; 709/237

(58) Field of Classification Search
None
See application file for complete search history.

(56) References Cited

U.S. PATENT DOCUMENTS

| 5,861,883 A | 1/1999 | Cuomo et al. |
| 5,941,988 A * | 8/1999 | Bhagwat et al. ................. 726/12 |
| 7,076,555 B1 | 7/2006 | Orman et al. |
| 8,332,532 B2 * | 12/2012 | Makela .......................... 709/237 |

(Continued)

FOREIGN PATENT DOCUMENTS

| CN | 1201948 A | 12/1998 |
| CN | 1582583 A | 2/2005 |

(Continued)

OTHER PUBLICATIONS

International Search Report dated Dec. 8, 2011 in connection with International Patent Application No. PCT/CN2011/079287.

(Continued)

*Primary Examiner* — Hassan Phillips
*Assistant Examiner* — Duc Duong

(57) ABSTRACT

A TCP proxy insertion and uninstall method is provided, including: during establishment of a TCP connection, forwarding a TCP connection establishing packet between a TCP client and a TCP server through an L3, and recording option information and sequence number information of the TCP connection establishing packet; performing determination on a packet according to a proxy policy; forwarding the received packet if it is determined that no proxy process is required for the packet, and updating the recorded sequence number information according to sequence number information of the received packet; and generating a client pseudo socket and a server pseudo socket according to the option information and sequence number information if it is determined that a proxy process is required for the packet, terminating the received packet by adopting the client pseudo socket and server pseudo socket, processing the terminated packet through an L7 and forwarding the processed packet.

21 Claims, 14 Drawing Sheets

U.S. PATENT DOCUMENTS

| | | |
|---|---|---|
| 2006/0224769 A1 | 10/2006 | Moonen |
| 2008/0080508 A1* | 4/2008 | Das et al. .................. 370/392 |
| 2009/0265471 A1 | 10/2009 | Li et al. |
| 2010/0046726 A1 | 2/2010 | Yang et al. |
| 2010/0250770 A1* | 9/2010 | Barreto et al. ............. 709/231 |
| 2011/0173248 A1* | 7/2011 | Hilt et al. .................. 709/203 |
| 2011/0289230 A1* | 11/2011 | Ueno ........................ 709/228 |
| 2012/0099601 A1* | 4/2012 | Haddad et al. ............. 370/401 |

FOREIGN PATENT DOCUMENTS

| | | |
|---|---|---|
| CN | 1642140 A | 7/2005 |
| CN | 1748393 A | 3/2006 |
| CN | 1753354 A | 3/2006 |
| CN | 101047704 A | 10/2007 |
| CN | 101170605 A | 4/2008 |
| CN | 101212719 A | 7/2008 |
| CN | 101247353 A | 8/2008 |
| CN | 101355524 A | 1/2009 |
| CN | 101420476 A | 4/2009 |
| CN | 102130910 A | 7/2011 |

OTHER PUBLICATIONS

Partial Translation of Written Opinion of the International Searching Authority in connection with International Patent Application No. PCT/CN2011/079287.

* cited by examiner

US 8,446,840 B2

TCP PROXY INSERTION AND UNINSTALL METHOD, AND SERVICE GATEWAY DEVICE

CROSS-REFERENCE TO RELATED APPLICATIONS

This application is a continuation of International Application No. PCT/CN2011/079287, filed on Sep. 2, 2011, which claims priority to Chinese Patent Application No. 201110048376.6, filed on Feb. 28, 2011, both of which are hereby incorporated by reference in their entireties.

TECHNICAL FIELD

The embodiments of the present invention relate to the field of communications technologies, and in particular, to a transmission control protocol (Transmission Control Protocol, abbreviated as TCP) proxy insertion and uninstall method, and a service gateway device.

BACKGROUND

In response to challenges faced by mobile broadband (Mobile BroadBand, MBB) operation, service gateway devices are generally deployed on gateways through which mobile terminals and mobile Internet are connected, to achieve delicacy control and management of data services. To achieve delicacy control and management of data services, the service gateway devices generally need to resolve content of data packets at layer 7 (L7), and perform related processing in accordance with the content and related attributes thereof, such as content adaptation, content enhancement, anti-virus, and network acceleration. Basically all network services are based on the TCP. Therefore, in order to implement the foregoing related processing, the service gateway devices need to intercept each TCP connection, and to add data, modify data, or delete data on the TCP connection. However, the TCP is connection-oriented, data-stream-oriented, and reliable, and provides a stream control mechanism. If data is added, modified or deleted simply, the correctness of connections is inevitably affected. A TCP proxy (TCP Proxy) technology is developed to ensure that operations, such as data addition, data modification or data deletion are performed based on correct TCP connections.

The TCP proxy includes explicit proxy and transparent proxy. In a transparent proxy mode, mobile stations do not need to specify an IP address of the proxy, and service gateway devices implement proxy of connections by intercepting the connections. The general process of the transparent proxy is as follows: A mobile station (Mobile Station, MS) sends a connection establishing packet to a service gateway device; after receiving the connection establishing packet, the service gateway device determines whether a proxy process is required; if no proxy process is required, the service gateway device directly forwards the connection establishing packet and subsequent packets to a serving provider (Serving Provider, SP). If a proxy process is required, the service gateway device generates a pseudo socket during a connection establishing phase according to TCP connection information, to disguise as the SP or the MS; after disguising as the SP or the MS, the service gateway device may perform termination processing on the connection establishing packet and the subsequent packets, and perform the foregoing related processing on terminated data at L7, such as content adaptation, content enhancement, anti-virus and network acceleration.

It can be seen from the foregoing TCP proxy process that, for a TCP connection, a TCP proxy process is performed all along or no TCP proxy process is performed at all. When a TCP proxy process is performed, packets are forwarded through the L7. When no TCP proxy process is performed, packets are transparently transmitted directly. The performance of forwarding through direct transparent transmission is much higher than the performance of forwarding through the L7. During delicacy control and management of data services, such as online on-demand, hypertext transfer protocol (HyperText Transfer Protocol, HTTP) large file download and header enhancement services, provided by operators through service gateway devices, generally a first packet or first few packets that an MS sends, to an SP, through a service gateway device for a service request need to be forwarded through the L7, while the subsequent packets do not need to be forwarded through the L7. However, according to the existing TCP proxy process, the TCP proxy process is performed all along, which definitely reduces system performance.

SUMMARY

Embodiments of the present invention provide a TCP proxy insertion method, a TCP proxy uninstall method and a service gateway device, to solve, to a certain extent, a problem of performance degradation resulted from performing TCP proxy process all along in the prior art, to improve system performance.

An embodiment of the present invention provides a TCP proxy insertion method, including:

during establishment of a TCP connection, forwarding a TCP connection establishing packet between a TCP client and a TCP server through an L3, and recording option information and sequence number information of the TCP connection establishing packet;

performing proxy determination on a received packet according to a proxy policy after the TCP connection is established; and if it is determined that no proxy process is required for the received packet according to the proxy policy, forwarding the received packet through the L3, and updating the recorded sequence number information according to sequence number information of the received packet; or if it is determined that a proxy process is required for the received packet according to the proxy policy, generating a client pseudo socket and a server pseudo socket according to the recorded option information and sequence number information, terminating the received packet by adopting the client pseudo socket and the server pseudo socket, processing the terminated packet through an L7 and forwarding the processed packet.

An embodiment of the present invention provides a TCP proxy uninstall method, including:

process and forward packets between a TCP client and a TCP server through an L7 by adopting a TCP proxy process;

after it is determined that no proxy process is required according to a proxy policy, instructing the TCP client and the TCP server to suspend sending packets, sending packets cached by a TCP proxy to each of the TCP client and the TCP server, and generating adhesion information; and performing, according to the adhesion information, sequence number correction processing on packets retransmitted by the TCP client and the TCP server after the suspension of packet sending is over, so that a difference between a corrected sequence number and a sequence number before correction is equal to a difference between a sequence number of a last sent packet and a sequence number of a packet expected to be received, where the sequence number of the last sent packet and the sequence number of the packet expected to be received are included in the adhesion information; and forwarding the processed packets through an L3.

An embodiment of the present invention provides a service gateway device, including:

a communication interface module, configured to receive a packet from a TCP client or a TCP server;

a proxy policy determination module, configured to determine whether the packet received by the communication interface module requires a TCP proxy process according to a proxy policy;

a layer 3 forwarding module, configured to forward, through an L3, the packet if it is determined by the proxy policy determination module that no TCP proxy process is required for the packet;

a connection information recording module, configured to, for a TCP connection establishing packet forwarded by the layer 3 forwarding module during establishment of a TCP connection, record option information and sequence number information of the TCP connection establishing packet, and for a packet forwarded by the layer 3 forwarding module after the TCP connection is established, update the recorded sequence number information according to sequence number information of the packet forwarded after the TCP connection is established;

a TCP proxy processing module, configured to generate a client pseudo socket and a server pseudo socket according to the recorded option information and sequence number information, if it is determined by the proxy policy determination module that a TCP proxy process is required for the packet, and terminate the packet by adopting the client pseudo socket and the server pseudo socket; and an application module, configured to perform L7 processing on the terminated packet, and forward the processed packet.

An embodiment of the present invention provides a service gateway device, including:

a communication interface module, configured to receive a packet from a TCP client or a TCP server;

a proxy policy determination module, configured to determine whether the packet received by the communication interface module requires a TCP proxy process according to a proxy policy;

a TCP proxy processing module, configured to generate a client pseudo socket and a server pseudo socket when the proxy policy determination module determines that a TCP proxy process is required, and perform termination processing on the received packet;

an application module, configured to perform L7 processing on the packet terminated by the TCP proxy processing module, and then forward the processed packet, where the TCP proxy processing module is further configured to, after the proxy policy determination module determines that no proxy process is required according to the proxy policy, instruct the TCP client and the TCP server to suspend sending packets, send cached packets to each of the TCP client and the TCP server, and generate adhesion information;

a connection adhesion processing module, configured to perform, according to the adhesion information, sequence number correction processing on packets retransmitted by the TCP client and the TCP server after the suspension of packet sending is over, so that a difference between a corrected sequence number and a sequence number before correction is equal to a difference between a sequence number of a last sent packet and a sequence number of a packet expected to be received, where the sequence number of the last sent packet and the sequence number of the packet expected to be received are included in the adhesion information; and a layer 3 forwarding module, configured to forward, through an L3, the packets processed by the connection adhesion processing module.

It can be seen from the foregoing technical solutions that, in the embodiments of the present invention, TCP proxy determination is performed on a received packet after a TCP connection is established, so that a TCP proxy process may be performed within a certain time period as required after the TCP connection is established, while no TCP proxy process is performed in other time periods. Unlike the prior art where the TCP proxy process is performed all along or no TCP proxy process is performed at all after the TCP connection is established in the prior art, the present invention implements flexible proxy, to avoid the problem of performance degradation resulted from a permanent proxy process, thereby improving system performance.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

To make the objectives, technical solutions, and advantages of the embodiments of the present invention clearer, the technical solutions provided by the embodiments of the present invention are hereinafter described clearly and completely with reference to the accompanying drawings. Evidently, the described embodiments are only some exemplary embodiments of the present invention, rather than all embodiments of the present invention. All other embodiments, which can be derived by persons of ordinary skill in the art from the embodiments of the present invention without any creative effort, shall fall within the protection scope of the present invention.

Figure 1:
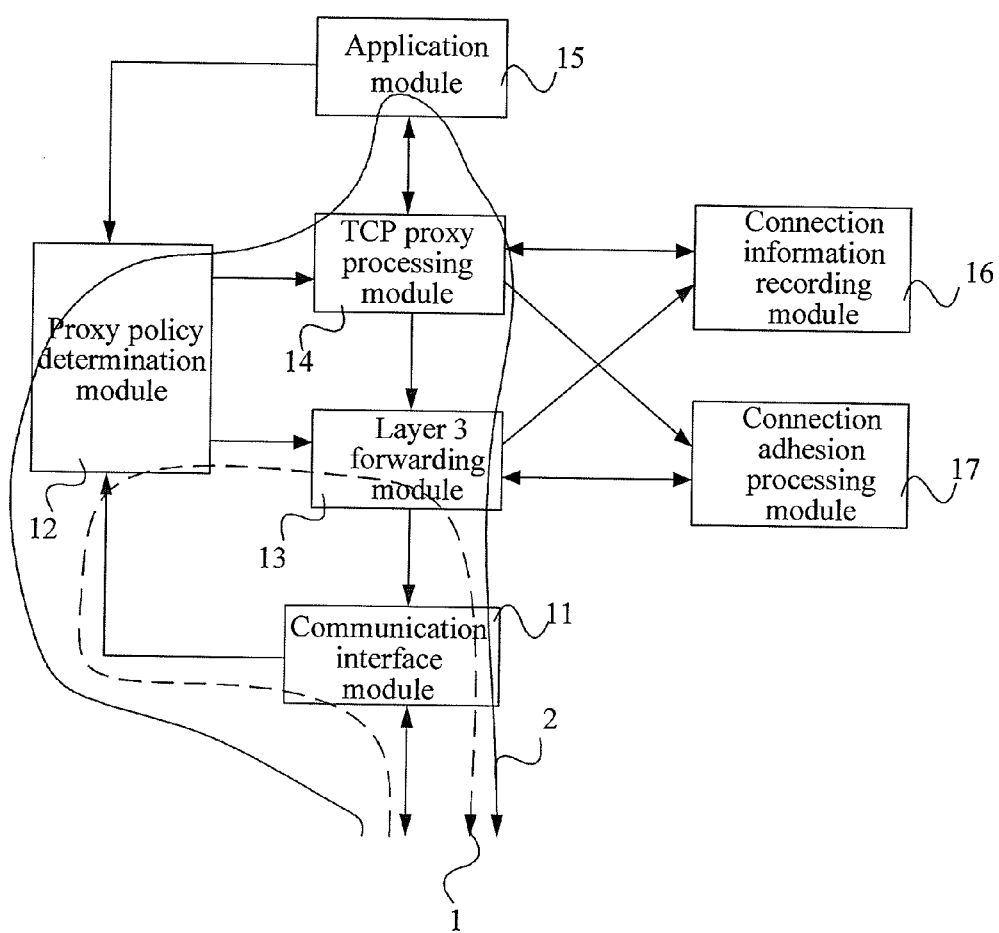
FIG. 1 is a schematic structural diagram of a service gateway device according to Embodiment 1 of the present invention.

In order to implement dynamic insertion and uninstall of a TCP proxy, an embodiment of the present invention provides a service gateway device. FIG. 1 is a schematic structural diagram of a service gateway device according to Embodiment 1 of the present invention, and the service gateway device includes: a communication interface module 11, a proxy policy determination module 12, a layer 3 forwarding module 13, a TCP proxy processing module 14, an application module 15, a connection information recording module 16, and a connection adhesion processing module 17.

The communication interface module 11 may provide functions of receiving and sending IP packets. The proxy policy determination module 12 may provide a function of determining whether to perform proxy on a connection. The layer 3 forwarding module 13 may provide host receiving and forwarding processing for IP packets. The TCP proxy processing module 14 may provide a standard TCP protocol processing mechanism, and is capable of generating a TCP client pseudo socket and a TCP server pseudo socket as required according to option information of a TCP connection packet, to disguise as a TCP client (pseudo client) and a TCP server (pseudo TCP server), respectively. The application module 15 may provide functions of identifying and resolving basic service protocols, and adding, deleting or modifying data on a connection, and instructing a proxy. The connection information recording module 16 may provide functions of intercepting and recording key information of a TCP connection. The connection adhesion processing module 17 may perform correction on sequence numbers of the TCP connection after the TCP connection is uninstalled.

Based on the structure shown in FIG. 1, insertion and uninstall of a TCP proxy may be implemented. A TCP proxy insertion method and a TCP proxy uninstall method are described below.

Figure 2:
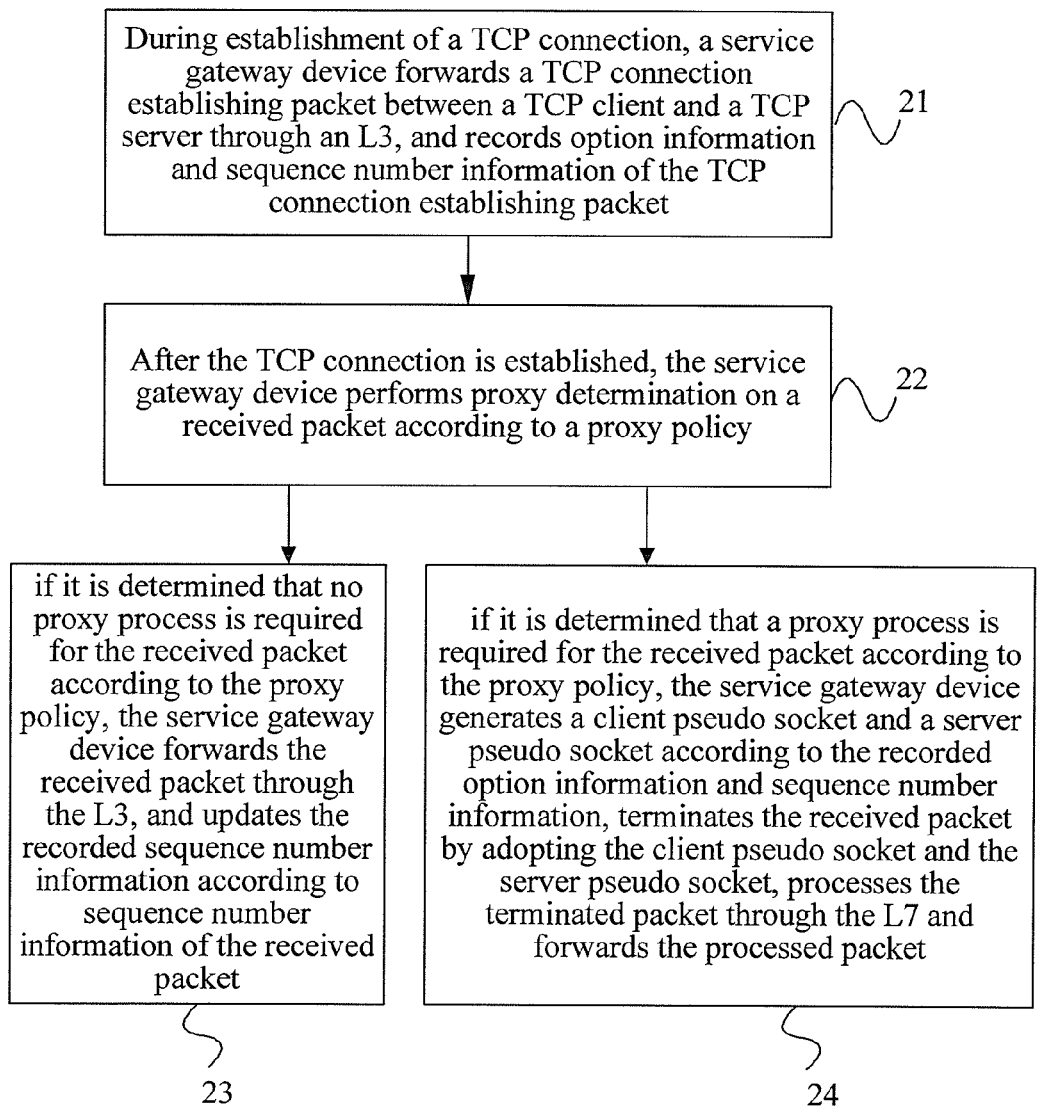
FIG. 2 is a schematic flow chart of a TCP proxy insertion method according to Embodiment 1 of the present invention.

FIG. 2 is a schematic flow chart of a TCP proxy insertion method according to Embodiment 1 of the present invention, which includes the following steps.

Step 21: During establishment of a TCP connection, a service gateway device forwards a TCP connection establishing packet between a TCP client and a TCP server through an L3, and records option information and sequence number information of the TCP connection establishing packet.

For example, in the embodiment of the present invention, it is taken as an example that the TCP client is an MS and the TCP server is an SP.

As described in the background of the invention, the TCP is a connection-based protocol, and a TCP connection needs to be established before data is transmitted between the MS and the SP. In the prior art, during establishment of a TCP connection, it is determined whether a TCP proxy process is required, and it is possible that a TCP proxy process is adopted to process a TCP connection establishing packet and the TCP proxy process is constantly performed subsequently; alternatively, during establishment of the TCP connection, it is determined that no TCP proxy process is performed, and no TCP proxy process is performed subsequently.

However, in the embodiment of the present invention, during establishment of a TCP connection, no TCP proxy process is performed all along. That is, in the embodiment of the present invention, the TCP connection establishing packet (three-way handshake packet) is transparently transmitted through an L3 directly, and the TCP connection establishing packet is not processed through an L7, while a TCP proxy process may be performed subsequently according to a policy, which is different from the prior art where no TCP proxy process is performed all along.

Referring to FIG. 1, during a process of transmitting the TCP connection establishing packet, the connection information recording module may record the option information and the sequence number information of the TCP connection establishing packet.

Specifically, referring to FIG. 1, a transmission path 1 of the TCP connection establishing packet may be: a communication interface module→a proxy policy determination module→a layer 3 forwarding module→the communication interface module. Following the foregoing path, the layer 3 forwarding module sends the option information and the sequence number information to the connection information recording module. It can be understood that, the layer 3 forwarding module may send the TCP connection establishing packet to the connection information recording module. The connection information recording module records the option information and the sequence number information, and returns the TCP connection establishing packet to the layer 3 forwarding module. Then the TCP connection establishing packet is forwarded through the communication interface module.

Step 22: After the TCP connection is established, the service gateway device performs proxy determination on a received packet according to a proxy policy; if no proxy process is required, perform step 23; otherwise, perform step 24.

The application module may send an instruction message to the proxy policy determination module, where the instruction message carries a proxy policy indicating which packets require a proxy process and which packets require no proxy process. Then, the proxy policy determination module performs TCP proxy determination according to the proxy policy.

Step 23: If it is determined that no proxy process is required for the received packet according to the proxy policy, the service gateway device forwards the received packet through the L3, and updates the recorded sequence number information according to sequence number information of the received packet.

For a process of forwarding the packet through the L3, reference may be made to the foregoing process of forwarding the TCP connection establishing packet, and the difference from the process of forwarding the TCP connection establishing packet lies in that, when a packet is forwarded after the TCP connection is established, the sequence number information of the received packet is adopted to update the recorded sequence number information.

Step 24: If it is determined that a proxy process is required for the received packet according to the proxy policy, the service gateway device generates a client pseudo socket and a server pseudo socket according to the recorded option information and sequence number information, terminates the received packet by adopting the client pseudo socket and the server pseudo socket, processes the terminated packet through the L7, and forwards the processed packet.

For example, referring to FIG. 1, the application module may determine whether a TCP proxy process is required according to a specific service. For example, the application module may set that a first packet of a first service requires a TCP proxy process, and other packets do not require a TCP proxy process. Then, the application module may write, into the proxy policy determination module, the set policy of determining whether a TCP proxy process is required. The proxy policy determination module may perform determination according to the written proxy policy after receiving a packet.

If determining that a proxy process is required, the proxy policy determination module sends the packet to a TCP proxy processing module; otherwise, the proxy policy determination module sends the packet to the layer 3 forwarding module.

After receiving the packet, the TCP proxy processing module may obtain the option information and sequence number information from the connection information recording module, and generate a client pseudo socket (MS socket) and a server pseudo socket (SP socket) according to the option information and the sequence number information.

After the pseudo sockets are generated, the service gateway device may disguise as a SP to perform termination processing on the packet, and communicate with a real MS, or the service gateway device may disguise as a MS to perform termination processing on the packet, and communicate with a real SP. For example, a pseudo client (MS') is corresponding to the client pseudo socket and communicates with the real SP; a pseudo server (SP') is corresponding to the server pseudo socket and communicates with the real MS. Packets between the SP' and the MS' needs to be processed through the L7. That is, the application module performs processing, such as data addition, deletion or modification.

Specifically, referring to FIG. 1, when a proxy process is required, a transmission path 2 of the packet is: a communication interface module→a proxy policy determination module→a TCP proxy processing module→an application module→the TCP proxy processing module→layer 3 forwarding module→the communication interface module.

It can be understood that, if no proxy process is required, the data path is shown as the path 1.

Figure 3:
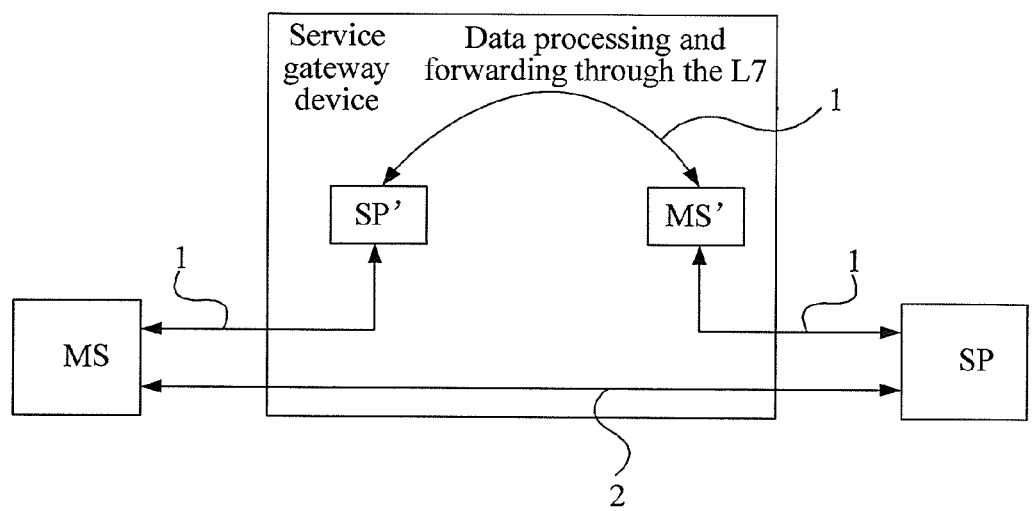
FIG. 3 is a schematic diagram of transmission paths before and after a TCP proxy is inserted according to an embodiment of the present invention.

Specifically, FIG. 3 is a schematic diagram of transmission paths before and after a TCP proxy is inserted according to an embodiment of the present invention. Referring to FIG. 3, in FIG. 3, a TCP client is specifically an MS, a TCP server is specifically an SP, a pseudo client is an MS', and a pseudo server is an SP'. If no proxy process is required, the transmission path is the path 1; if a proxy process is required, the transmission path is the path 2.

In the embodiment of the present invention, no TCP proxy determination is performed during establishment of a TCP connection, but related information is recorded, so that when a TCP proxy process is required, pseudo sockets are generated according to the recorded related information, and dynamic insertion of a TCP proxy process may be implemented. That is, a TCP proxy is inserted when the TCP proxy process is required, which is different from the prior art where after it is determined that a TCP proxy process is required during a TCP establishment phase, the TCP proxy process is adopted all along in the subsequent process. With the embodiment, flexible proxy may be implemented, to avoid the problem of performance degradation resulted from a permanent proxy process, thereby improving system performance.

In the embodiment, flexible proxy may be implemented by inserting a TCP proxy when the TCP proxy process is required, to avoid the problem of performance degradation resulted from a permanent proxy process, thereby improving system performance.

Figure 4:
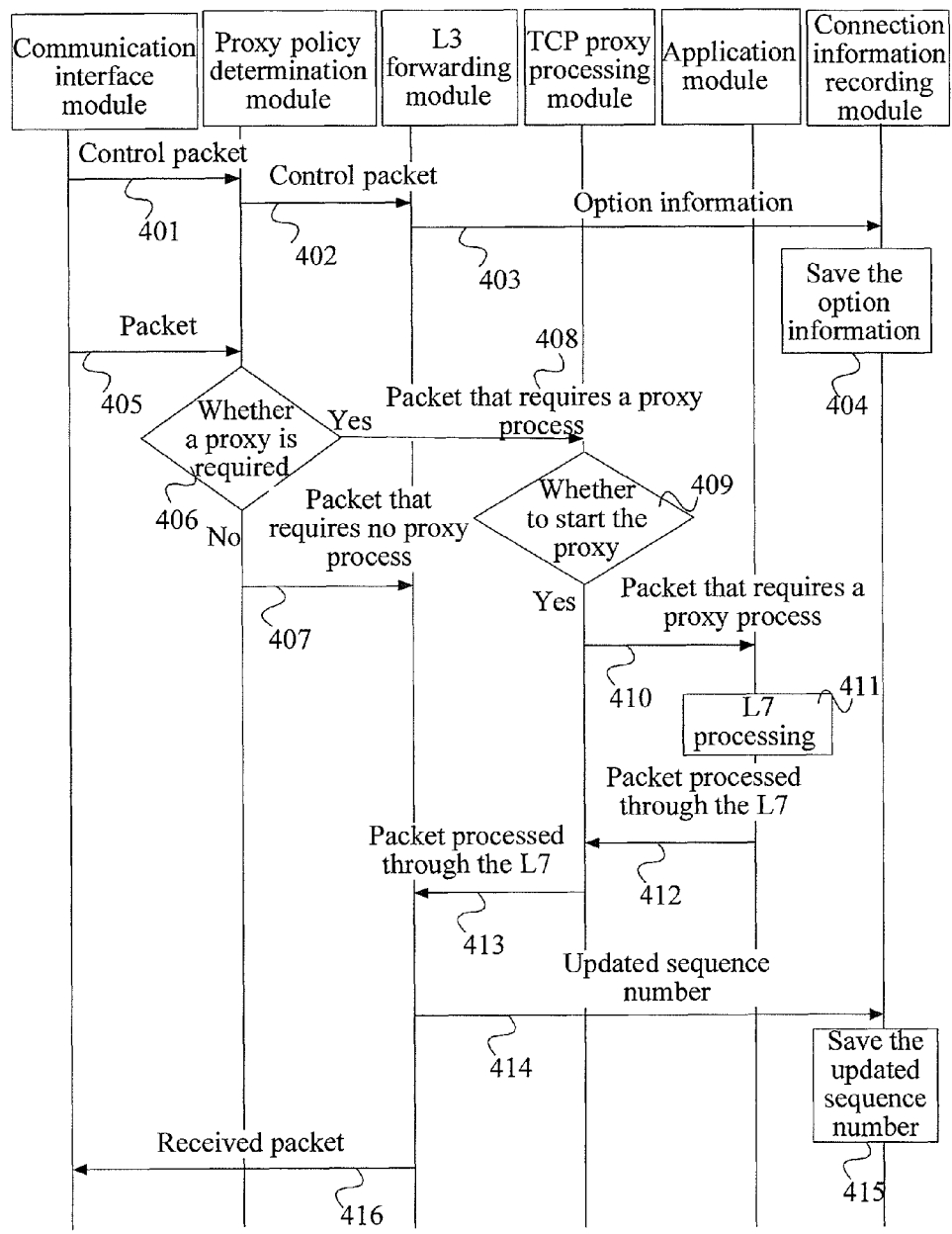
FIG. 4 is a schematic flow chart of a TCP proxy insertion method according to Embodiment 2 of the present invention.

FIG. 4 is a schematic flow chart of a TCP proxy insertion method according to Embodiment 2 of the present invention, which includes the following steps.

Step 401: A communication interface module receives a control packet sent from a communication end, and sends the control packet to a proxy policy determination module.

The control packet is a TCP connection establishing packet.

Step 402: The proxy policy determination module determines that the control packet requires no proxy process, and sends the control packet to a layer 3 forwarding module.

For example, some policies may be configured in the proxy policy determination module in advance, the some policies are used for specifying that a proxy process is required for the received packet which contains some 5-tuple records or a proxy process is required for the received packet which contains data of a payload; then, it may be determined according to the 5-tuple records of the received packet whether a proxy process is required for the received packet, or it may be determined according to the data of the payload of the received packet whether a proxy process is required for the received packet. Specifically, the packet in this step is a control packet, and requires no proxy process. Therefore, the proxy policy determination module may determine that no proxy process is performed, and forward the control packet to the layer 3 forwarding module.

Step 403: The layer 3 forwarding module sends option information of the control packet to a connection information recording module.

Step 404: The connection information recording module saves the option information.

Step 405: After TCP connection is established, the communication interface module receives a packet, and sends the received packet to the proxy policy determination module.

Step 406: The proxy policy determination module determines whether a proxy process is required; if no proxy process is required, perform step 407; otherwise, perform step 408.

Step 407: The proxy policy determination module sends the packet that requires no proxy process to the layer 3 forwarding module; then, perform step 414.

Step 408: The proxy policy determination module sends the packet that requires a proxy process to a TCP proxy processing module.

Step 409: The TCP proxy processing module determines whether to start the proxy process; if yes, perform step 410.

For example, the TCP proxy processing module may obtain an initial data sequence number of the received packet; if determining that all data smaller than the initial data sequence number is acknowledged (ACK), the TCP proxy policy processing module starts the proxy process. That is, if during a proxy process, a packet that affects link disconnection is sent or received, suspend the proxy process, and continue performing the layer 3 forwarding on the packet; if no proxy process is required, continue recording a sequence number of the packet until a proxy process is required for the packet.

Specifically, the TCP proxy processing module may obtain the recorded data sequence number information from the connection information recording module, and according to the sequence number information, perform the foregoing determination of whether the data is acknowledged. Specifically, the connection information recording module may record packet sequence numbers and ACK sequence numbers of packets expected to be received in a direction from the TCP client to the TCP server and may record packet sequence numbers and ACK sequence numbers of packets expected to be received in a direction from the TCP server to the TCP client, when it is obtained that a TCP proxy process is required. If the recorded packet sequence number of a packet expected to be received in the direction from the TCP client to the TCP server is equal to the recorded ACK sequence number of a packet in the direction from the TCP server to the TCP client, and the recorded packet sequence number of a packet expected to be received in the direction from the TCP server to the TCP client is equal to the recorded ACK sequence number of a packet in the direction from the TCP client to the TCP server, it is determined that all data smaller than the initial data sequence number is acknowledged (ACK), and the proxy process is started.

For example, the packet sequence numbers of packets expected to be received include sp_rcv_nxt and ms_rcv_nxt, and the ACK sequence numbers include sp_lastack and ms_lastlack. sp_rcv_nxt is the recorded packet sequence number of the packet expected to be received in the direction from the MS to the SP, and the value ultimately recorded is a value when the proxy process starts; ms_rcv_nxt is the recorded packet sequence number of the packet expected to be received in the direction from the SP to the MS, and the value ultimately recorded is a value when the proxy process starts; sp_lastack is a largest ACK sequence number in the direction from the SP to the MS; and ms_lastlack is a largest ACK sequence number in the direction from the MS to the SP.

If sp_rcv_nxt=sp_lastack and ms_rcv_nxt=ms_lastlack, the TCP proxy process starts.

For the recording and updating method of the foregoing sequence numbers, reference may be made to the following description.

Step 410: The TCP proxy processing module generates pseudo sockets, and sends the packet that requires a proxy process to an application module.

Step 411: The application module performs L7 processing, such as content adaptation, content enhancement, anti-virus, network acceleration and advertisement insertion, on the packet that requires a proxy process.

Step 412: The application module sends the packet that has undergone the L7 processing to the TCP proxy processing module.

Step 413: The TCP proxy processing module sends the packet that has undergone the L7 processing to the layer 3 forwarding module.

Step 414: The layer 3 forwarding module records and updates the data sequence number of the received packet, and sends the updated sequence number to the connection information recording module.

Step 415: The connection information recording module saves the updated data sequence number.

It can be understood that, alternatively, the layer 3 forwarding module may send the packet to the connection information recording module, and then the connection information recording module performs recording and updating.

Step 416: The layer 3 forwarding module sends the received packet to the communication interface module, so that the packet is sent to another communication end.

Figure 5:
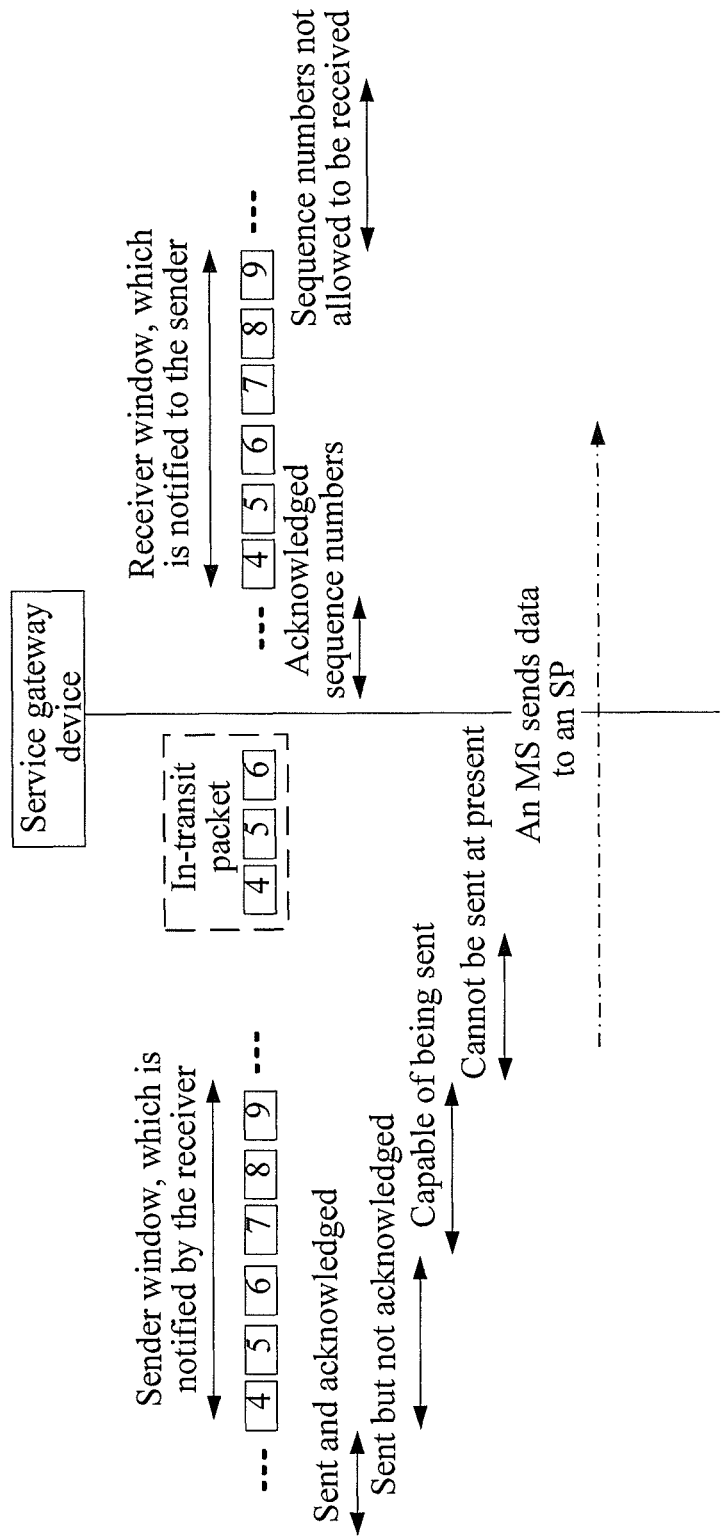
FIG. 5 is a schematic diagram of packet transmission in a direction from an MS to an SP according to an embodiment of the present invention.
Figure 6:
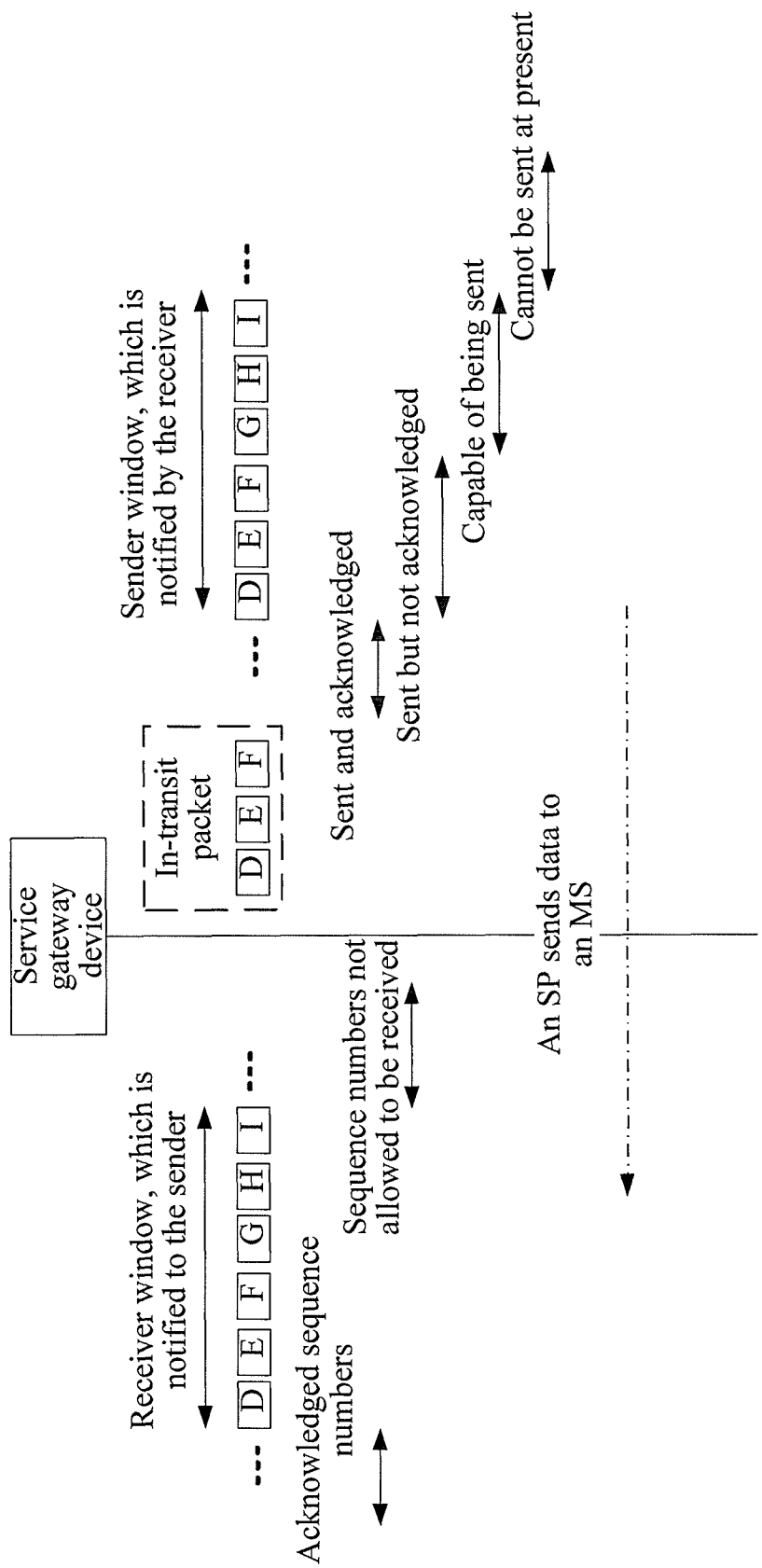
FIG. 6 is a schematic diagram of packet transmission in a direction from an SP to an MS according to an embodiment of the present invention.

FIG. 5 is a schematic diagram of packet transmission in a direction from an MS to an SP according to an embodiment of the present invention. FIG. 6 is a schematic diagram of packet transmission in a direction from an SP to an MS according to an embodiment of the present invention. Each packet includes multiple segments of data. For example, an in-transit packet may include data 4, 5 and 6 and data D, E, and F.

Figure 7:
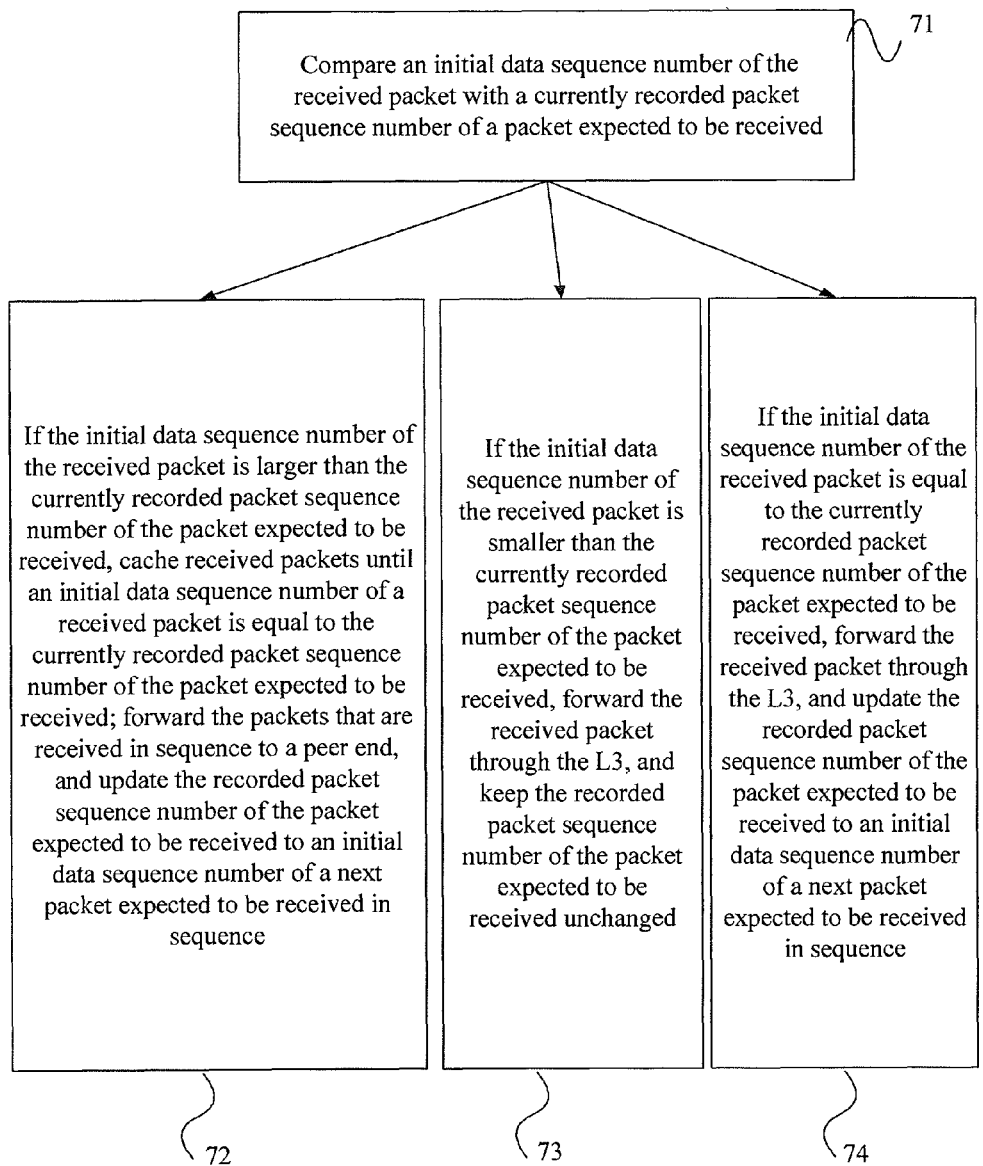
FIG. 7 is a schematic flow chart of recording and updating a packet sequence number of a packet expected to be received according to an embodiment of the present invention.

FIG. 7 is a schematic flow chart of recording and updating a packet sequence number of a packet expected to be received according to an embodiment of the present invention, which includes the following steps.

Step 71: Compare a packet sequence number (an initial data sequence number) of the received packet with a currently recorded packet sequence number of a packet expected to be received, and then execute one of the following steps to perform corresponding processing.

Step 72: If the initial data sequence number of the received packet is larger than the currently recorded packet sequence number of the packet expected to be received, cache received packets until an initial data sequence number of a received packet is equal to the currently recorded packet sequence number of the packet expected to be received; forward the packets that are received in sequence to a peer end, and update the recorded packet sequence number of the packet expected to be received to an initial data sequence number of a next packet expected to be received in sequence.

Step 73: If the initial data sequence number of the received packet is smaller than the currently recorded packet sequence number of the packet expected to be received, forward the received packet through the L3, and keep the recorded packet sequence number of the packet expected to be received unchanged.

Step 74: If the initial data sequence number of the received packet is equal to the currently recorded packet sequence number of the packet expected to be received, forward the received packet through the L3, and update the recorded packet sequence number of the packet expected to be received to an initial data sequence number of a next packet expected to be received in sequence.

In the direction from the MS to the SP:

1) If the initial data sequence number of the received packet is larger than the currently recorded sp_rcv_nxt, cache received packets until an initial data sequence number of a received packet is equal to the currently recorded sp_rcv_nxt, and then forward the cached packets in sequence, and update the value of the recorded sp_rcv_nxt to an initial data sequence number of a next packet received in sequence.

For example, if the currently recorded sp_rcv_nxt is equal to 5, all packets whose initial data sequence numbers are larger than 5 are cached until a packet whose initial data sequence number is equal to 5 is received. Then, the packets received in sequence are forwarded, and sp_rcv_nxt is updated to be a sum of 5 and a length of each of the received packets. If the length of the received packet is 1, the updated sp_rcv_nxt is equal to 6.

2) If the initial data sequence number of the received packet is smaller than the currently recorded sp_rcv_nxt, forward the received packet, and keep the value of the recorded sp_rcv_nxt unchanged.

For example, if the currently recorded sp_rcv_nxt is equal to 5, all packets whose initial data sequence numbers are smaller than 5 are forwarded, and the recorded sp_rcv_nxt is equal to 5.

3) If the initial data sequence number of the received packet is equal to the currently recorded sp_rcv_nxt, forward the received packet, and update the value of the recorded spr_cv_nxt to an initial data sequence number of a next packet received in sequence.

For example, if the currently recorded sp_rcv_nxt is equal to 5, and the initial data sequence number of the received packet is equal to 5, the received packet is forwarded, and sp_rcv_nxt is updated to be a sum of 5 and a length of the received packet. If the length of the received packet is 1, the updated sp_rcv_nxt is equal to 6.

In the direction from the SP to the MS:

1) If the initial data sequence number of the received packet is larger than the currently recorded ms_rcv_nxt, cache received packets until an initial data sequence number of a received packet is equal to the currently recorded ms_rcv_nxt, and then forward the cached packets in sequence, and update the value of the recorded ms_rcv_nxt to an initial data sequence number of a next packet received in sequence.

For example, if the currently recorded ms_rcv_nxt is equal to 5, all packets whose initial data sequence numbers are larger than 5 are cached until a packet whose initial data sequence number is equal to 5 is received. Then, the packets received in sequence are forwarded, and ms_rcv_nxt is updated to be a sum of 5 and a length of each of the packets. If the length of the packet is 1, the updated ms_rcv_nxt is equal to 6.

(2) If the initial data sequence number of the received packet is smaller than the currently recorded ms_rcv_nxt, forward the received packet, and keep the value of the recorded ms_rcv_nxt unchanged.

For example, if the currently recorded ms_rcv_nxt is equal to 5, all packets whose initial data sequence numbers are smaller than 5 are forwarded, and the recorded ms_rcv_nxt is equal to 5.

(3) If the initial data sequence number of the received packet is equal to the currently recorded ms_rcv_nxt, forward the received packet, and update the value of the recorded ms_rcv_nxt to an initial data sequence number of a next packet received in sequence.

For example, if the currently recorded ms_rcv_nxt is equal to 5, and the initial data sequence number of the received packet is equal to 5, the received packet is forwarded, and ms_rcv_nxt is updated to be a sum of 5 and a length of the received packet. If the length of the received packet is 1, the updated ms_rcv_nxt is equal to 6.

If no policy for requiring a proxy process is obtained, packets are forwarded through the L3, and the recorded ACK sequence number is updated to a largest ACK sequence number in the received packets.

Figure 8:
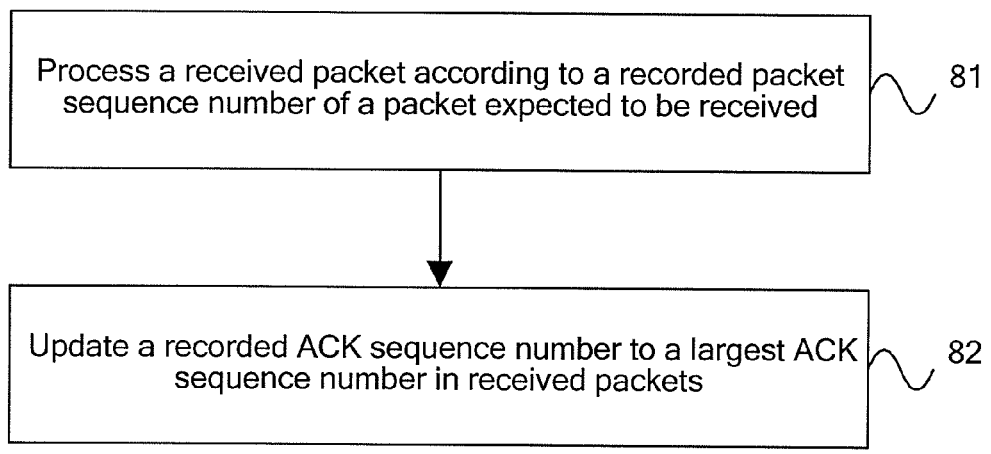
FIG. 8 is a schematic flow chart of recording and updating an ACK sequence number after obtaining that a proxy process is required according to an embodiment of the present invention.

FIG. 8 is a schematic flow chart of recording and updating an ACK sequence number after obtaining that a proxy process is required according to an embodiment of the present invention, which includes the following steps.

Step 81: Process a received packet according to a recorded packet sequence number of a packet expected to be received.

Step 82: Update a recorded ACK sequence number to a largest ACK sequence number in received packets. Step 81 may be implemented as follows:

1) If the packet is a data packet including an ACK flag, step 81 includes:

if an initial data sequence number of the data packet is smaller than a packet sequence number corresponding to a dividing line in the same direction, and the data packet includes data whose sequence number is larger than or equal to the packet sequence number corresponding to the dividing line in the same direction, deleting the data whose sequence number is larger than or equal to the packet sequence number corresponding to the dividing line in the same direction from the data packet, modifying a length of the packet, and forwarding the packet to a peer end after recalculating a checksum, where if a received packet is from a TCP client, the peer end is a TCP server; if a received packet is from a TCP server, the peer end is a TCP client;

or, if an initial data sequence number of the data packet is larger than or equal to a packet sequence number corresponding to a dividing line in the same direction, deleting data of the data packet, modifying a length of the packet, modifying a packet sequence number of the data packet to the packet sequence number corresponding to the dividing line in the same direction, and forwarding the packet to a peer end after recalculating a checksum, where if a received packet is from a TCP client, the peer end is a TCP server; if a received packet is from a TCP server, the peer end is a TCP client;

or, if all initial data sequence numbers of a data packet are smaller than a packet sequence number corresponding to a dividing line in the same direction, and the data packet does not include data after the packet sequence number corresponding to the dividing line in the same direction, forwarding the data packet to a peer end, where if a received packet is from a TCP client, the peer end is a TCP server; if a received packet is from a TCP server, the peer end is a TCP client.

2) If the packet is a pure ACK packet, step 81 includes:

transparently transmitting the pure ACK packet to a peer end, where if a received packet is from a TCP client, the peer end is a TCP server; if a received packet is from a TCP server, the peer end is a TCP client.

seq identifies the initial data sequence number of the received packet, which is specifically described as follows:

In the direction from the MS to the SP:

1) If the packet is a data packet including an ACK flag, the following three cases are included.

Case 1: If seq is smaller than the currently recorded sp_rcv_nxt, and the received data packet includes data whose sequence number is larger than or equal to the currently recorded sp_rcv_nxt, the data whose sequence number is larger than or equal to the currently recorded sp_rcv_nxt is deleted from the received data packet, a length of the packet is modified, and the data packet is forwarded to a peer end after a checksum is recalculated.

Case 2: If seq is larger than or equal to sp_rcv_nxt, data of the received data packet is deleted, a length of the packet is modified, seq is updated to sp_rcv_nxt, and the data packet is forwarded to a peer end after a checksum is recalculated.

Case 3: If all sequence numbers of data included in the received data packet are smaller than the currently recorded sp_rcv_nxt, and the data packet does not include data larger than or equal to sp_rcv_nxt, the received data packet is forwarded to a peer end.

2) If the packet is a pure ACK packet, the pure ACK packet is directly forwarded to the SP.

In the direction from the SP to the MS:

1) If the packet is a data packet including an ACK flag, the following three cases are included.

Case 1: If seq is smaller than the currently recorded ms_rcv_nxt, and the received data packet includes data whose sequence number is larger than or equal to the currently recorded ms_rcv_nxt, the data whose sequence number is larger than or equal to the currently recorded ms_rcv_nxt is deleted from the received data packet, a length of the packet is modified, and the data packet is forwarded to a peer end after a checksum is recalculated. The initial data sequence number of the processed data packet remains unchanged.

Case 2: If seq is larger than or equal to ms_rcv_nxt, data of the received data packet is deleted, a length of the packet is modified, seq is updated to ms_rcv_nxt, and the data packet is forwarded to a peer end after a checksum is recalculated.

Case 3: If all sequence numbers of data included in the received data packet are smaller than the currently recorded ms_rcv_nxt, and the data packet does not include data larger than or equal to ms_rcv_nxt, the received data packet is forwarded to a peer end.

2) If the packet is a pure ACK packet, the pure ACK packet is directly forwarded to the MS.

With the foregoing processing on the sequence number information according to the embodiment of the present invention, it can be implemented that a TCP proxy is inserted at the right time, thereby improving system performance.

Figure 9:
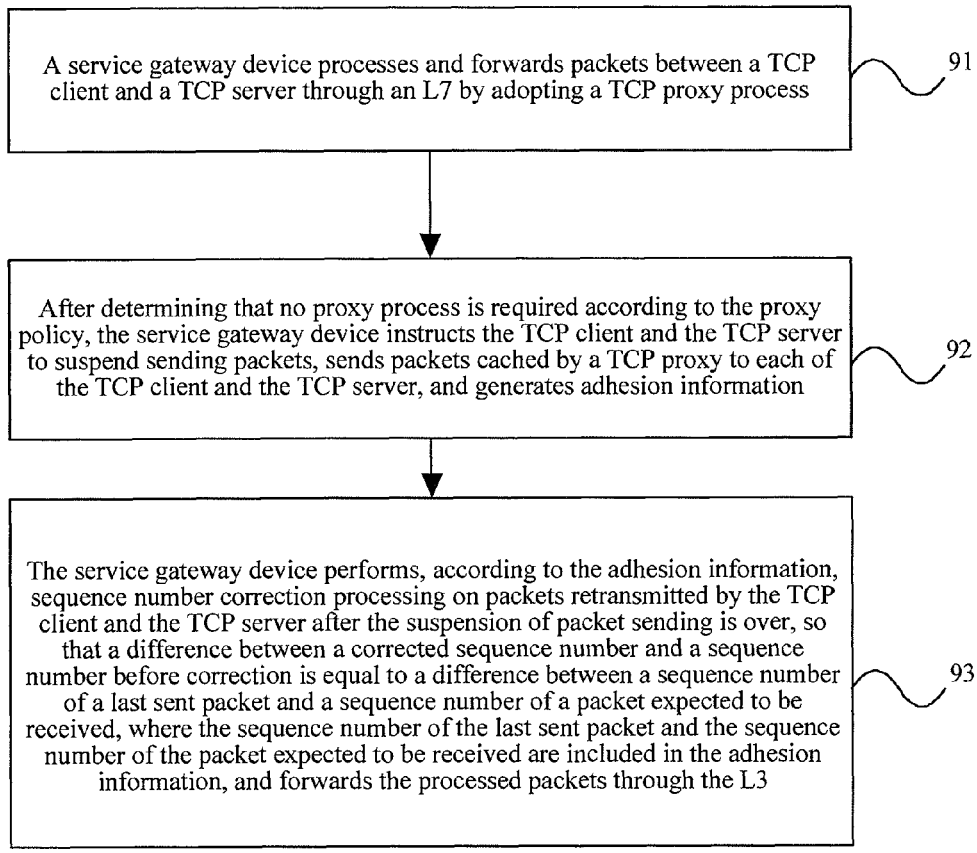
FIG. 9 is a schematic flow chart of a TCP proxy uninstall method according to Embodiment 1 of the present invention.

FIG. 9 is a schematic flow chart of a TCP proxy uninstall method according to Embodiment 1 of the present invention, which includes the following steps.

Step 91: A service gateway device processes and forwards packets between a TCP client and a TCP server through an L7 by adopting a TCP proxy process.

For example, referring to FIG. 1, packets are forwarded through a path 1.

Step 92: After determining that no proxy process is required according to the proxy policy, the service gateway device instructs the TCP client and the TCP server to suspend sending packets, sends packets cached by a TCP proxy to each of the TCP client and the TCP server, and generates adhesion information.

Referring to FIG. 1, a proxy policy determination module may determine that no proxy process is required according to policy information saved in advance.

If no proxy process is required, a TCP proxy processing module sends updated data sequence numbers (a packet sequence number and an ACK sequence number of a last packet sent by the corresponding TCP client and a packet sequence number and an ACK sequence number of a last packet sent by the TCP server, when it is obtained that no proxy process is required) to a connection adhesion processing module.

Step 93: The service gateway device performs, according to the adhesion information, sequence number correction processing on packets retransmitted by the TCP client and the TCP server, after the suspension of packet sending is over, so that a difference between a corrected sequence number and a sequence number before correction is equal to a difference between a sequence number of a last sent packet and a sequence number of a packet expected to be received, where the sequence number of the last sent packet and the sequence number of the packet expected to be received are included in the adhesion information; and forwards the processed packets through an L3.

After the proxy is uninstalled, the connection adhesion processing module may process subsequent packets according to the adhesion information.

Figure 10:
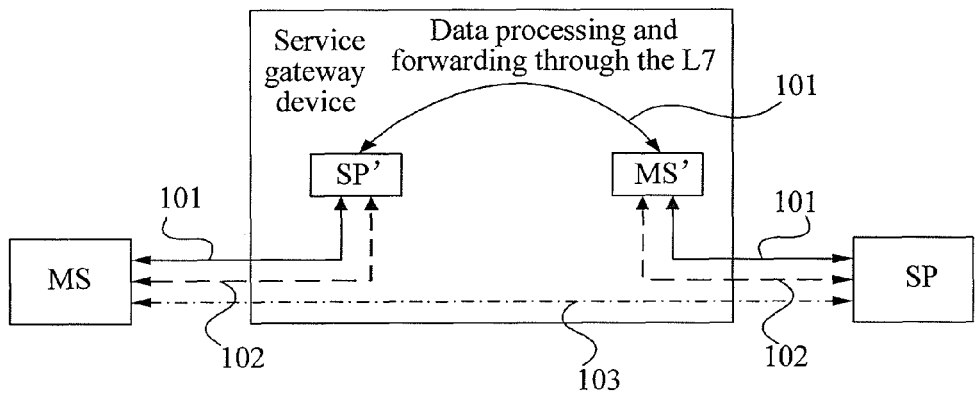
FIG. 10 is a schematic diagram of data transmission paths in a TCP proxy uninstall process according to an embodiment of the present invention.

FIG. 10 is a schematic diagram of data transmission paths during a TCP proxy uninstall process according to an embodiment of the present invention, where before a TCP proxy is uninstalled, a data transmission path is 101; during the TCP proxy uninstall, the data transmission path is 102, and the service gateway device is required to notify the MS and the SP that a window is 0; after the TCP proxy is uninstalled, the data transmission path is 103, and processing of the connection adhesion processing module is required.

In the embodiment, the proxy is uninstalled when the TCP proxy process is not required, to avoid the problem of system performance degradation resulted from a permanent TCP proxy process, thereby improving system performance.

Figure 11:
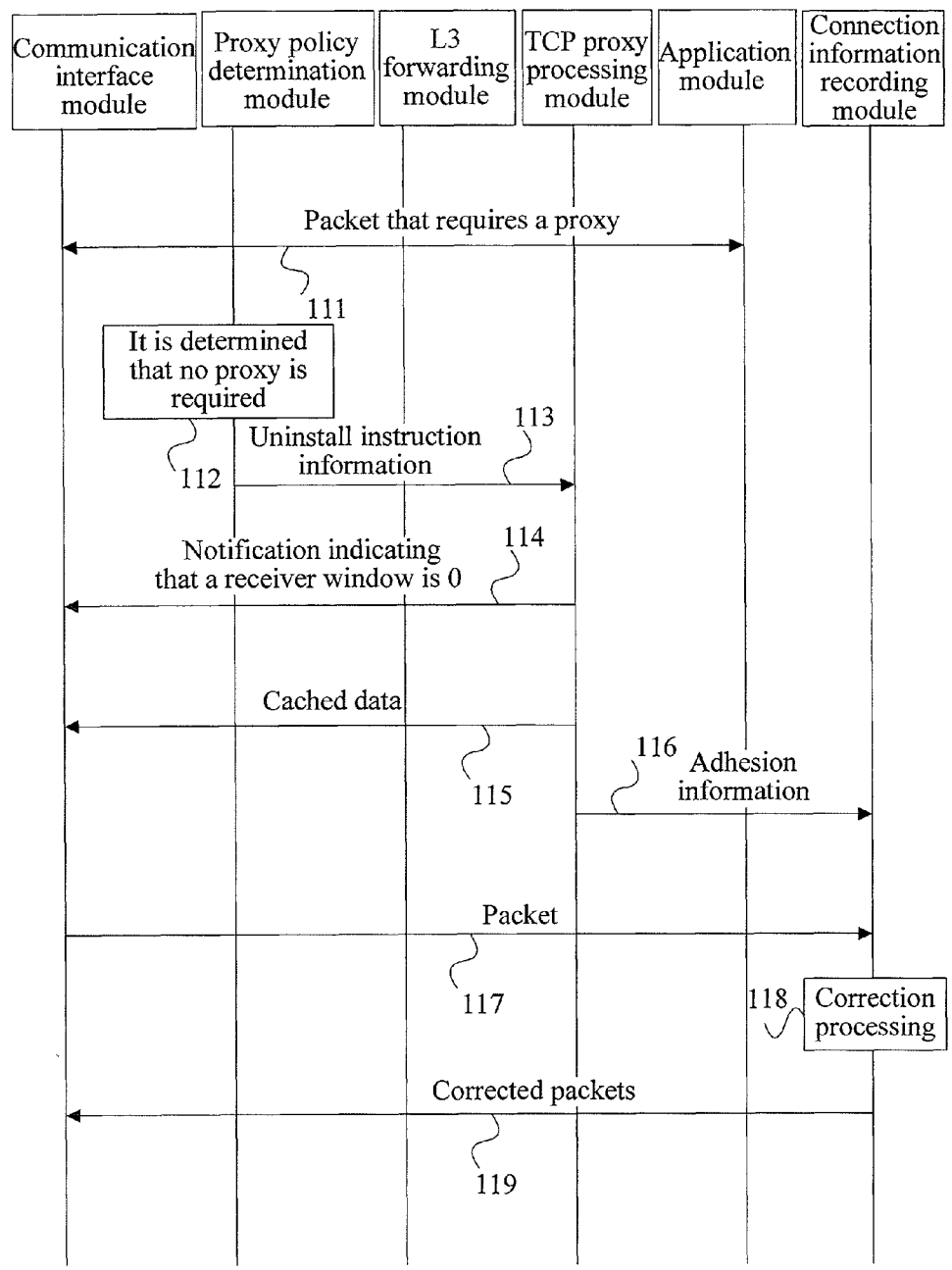
FIG. 11 is a schematic flow chart of a TCP proxy uninstall method according to Embodiment 2 of the present invention.

FIG. 11 is a schematic flow chart of a TCP proxy uninstall method according to Embodiment 2 of the present invention, which includes the following steps.

Step 111: Transmit packets, which require a proxy process, between two communication ends after the packets are processed by a TCP proxy processing module and an application module.

For detailed implementation, reference may be made to the foregoing TCP proxy insertion process.

Step 112: A proxy policy determination module determines that no proxy process is required.

Step 113: The proxy policy determination module sends uninstall instruction information to the TCP proxy processing module.

Step 114: The TCP proxy processing module disguises as an MS and an SP and sends a notification indicating that a receiver window is 0 to a real SP and a real MS, respectively, to prevent the service gateway device from continuously receiving data.

The TCP proxy processing module may disguise as the MS (MS') by using an MS pseudo socket, and disguise as the SP (SP') by using an SP pseudo socket.

Further, after it is notified that the receiver window is 0, even if the service gateway device continues to receive data, the received data is deleted from the packets, but the service gateway device continues to process packets.

Step 115: The TCP proxy processing module sends cached data to each of the MS and SP, where the data carries that the window (a value of a windows field) is 0.

Step 116: The TCP proxy processing module sends adhesion information to a connection adhesion processing module.

Definitely, if link disconnection packets, such as RST and FIN, are received in an adhesion process, adhesion is terminated.

Step 117: The connection adhesion processing module receives packets sent from a communication end.

A window enlargement process after uninstall may be automatically completed by the MS and the SP, or the service gateway device may send packets to each of the MS and the SP, but the window is not 0.

Step 118: The connection adhesion processing module performs correction processing on the received packets.

For example, in the case that redirection is not required, the adhesion information may include: a packet sequence number (MS'_seq) and an ACK sequence number (MS'_ack) of a last packet sent in a direction from a TCP client to a TCP server, and a packet sequence number (MS'_seq_rcv_next) and an ACK sequence number (MS'_ack_rcv_next) of a packet expected to be received, where the packet sequence numbers and the ACK sequence numbers are recorded by a client pseudo socket (MS'); and a packet sequence number (SP'_seq) and an ACK sequence number (SP'_ack) of a last packet sent in a direction from the TCP server to the TCP client, and a packet sequence number (SP'_seq_rcv_next) and an ACK sequence number (SP'_ack_rcv_next) of a packet expected to be received, where the packet sequence numbers and the ACK sequence numbers are recorded by a server pseudo socket.

The processing the packets between the TCP client and the TCP server according to the adhesion information includes:

correcting the packet sequence number and the ACK sequence number of the packet in the direction from the TCP client to the TCP server, so that a difference between the corrected packet sequence number and a packet sequence number before correction is equal to a difference between the packet sequence number of the last sent packet recorded by the pseudo TCP client and the packet sequence number of the packet expected to be received recorded by the pseudo TCP server, and that a difference between the corrected ACK sequence number and an ACK sequence number before correction is equal to a difference between the ACK sequence number of the last sent packet recorded by the pseudo TCP client and the ACK sequence number of the packet expected to be received recorded by the pseudo TCP server; and correcting the packet sequence number and the ACK sequence number of the packet in the direction from the TCP server to the TCP client, so that a difference between the corrected packet sequence number and a packet sequence number before correction is equal to a difference between the packet sequence number of the last sent packet recorded by the pseudo TCP server and the packet sequence number of the packet expected to be received recorded by the pseudo TCP client, and that a difference between the corrected ACK sequence number and an ACK sequence number before correction is equal to a difference between the ACK sequence number of the last sent packet recorded by the pseudo TCP server and the ACK sequence number of the packet expected to be received recorded by the pseudo TCP client. The processing for the packet sequence number and ACK sequence number of the last packet sent by the corresponding TCP client and the packet sequence number and ACK sequence number of the last packet sent by the TCP server when it is obtained that no proxy process is required includes:

for example, if in the adhesion information, the sequence numbers recorded by the sp' socket are: SP'_seq=200, SP'_ack=80, SP'_seq_rcv_next=300 and SP'_ack_rcv_next=60; and the sequence numbers recorded by the ms' socket are: MS'_seq=100; MS'_ack=50, MS'_seq_rcv_next=400 and MS'_ack_rcv_next=70, modifying the packet sequence number 300 and the ACK sequence number 60 of the packet in the direction from the MS to the SP to be the packet sequence number 100 and the ACK sequence number 50, respectively; and modifying the packet sequence number 400 and the ACK sequence number 70 of the packet in the direction from the SP to the MS to be the packet sequence number 200 and the ACK sequence number 80, respectively.

Step 119: The connection adhesion processing module sends the corrected packets to another communication end.

In the embodiment, the TCP proxy is uninstalled when the TCP proxy process is not required, to avoid the problem resulted from a permanent TCP proxy process, thereby improving system performance.

Figure 12:
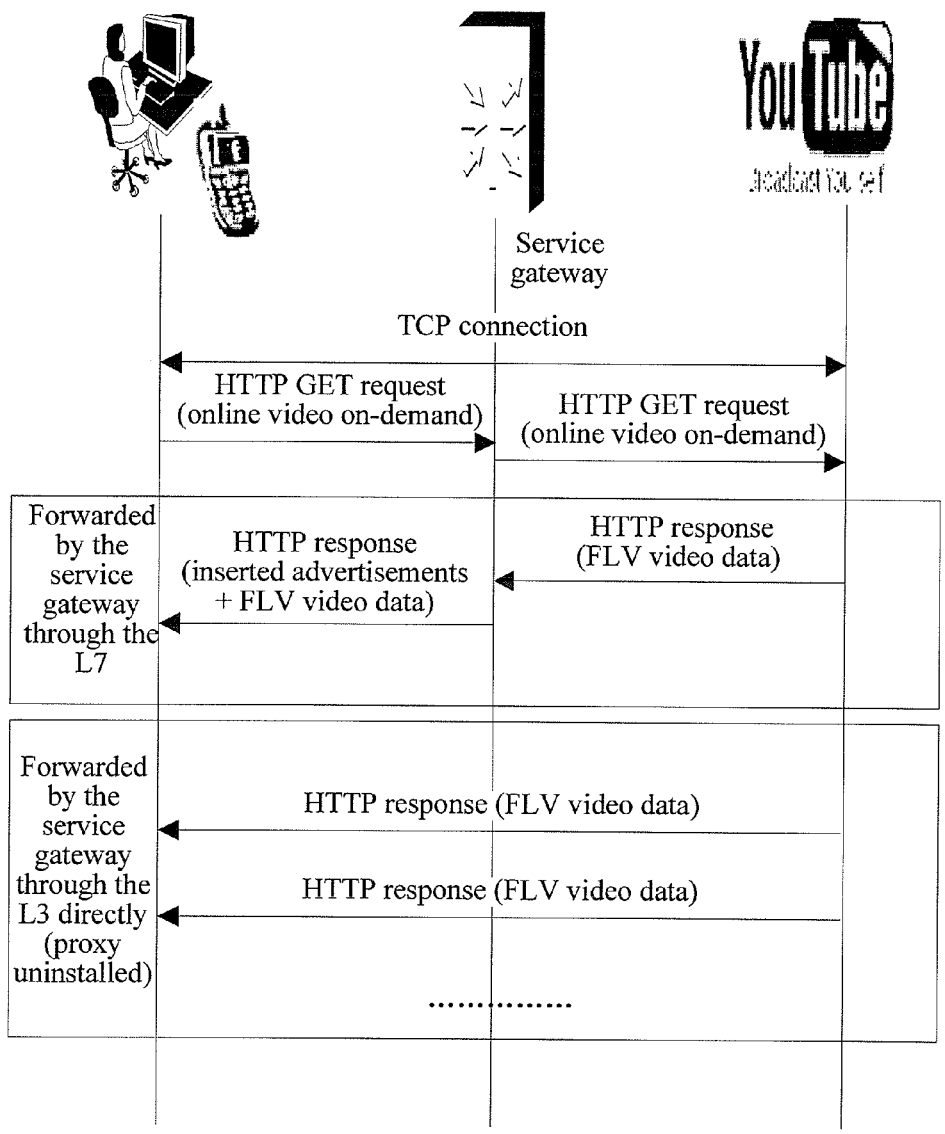
FIG. 12 is a schematic flow chart of a service 1 corresponding to dynamic insertion and uninstall of a TCP proxy according to an embodiment of the present invention.

FIG. 12 is a schematic flow chart of a service 1 corresponding to dynamic insertion and uninstall of a TCP proxy according to an embodiment of the present invention. Referring to FIG. 12, previous HTTP responses are forwarded through an L7, and then subsequent long-time large-amount video data downloaded may be directly forwarded through an L3, thus the download can be accelerated.

Figure 13:
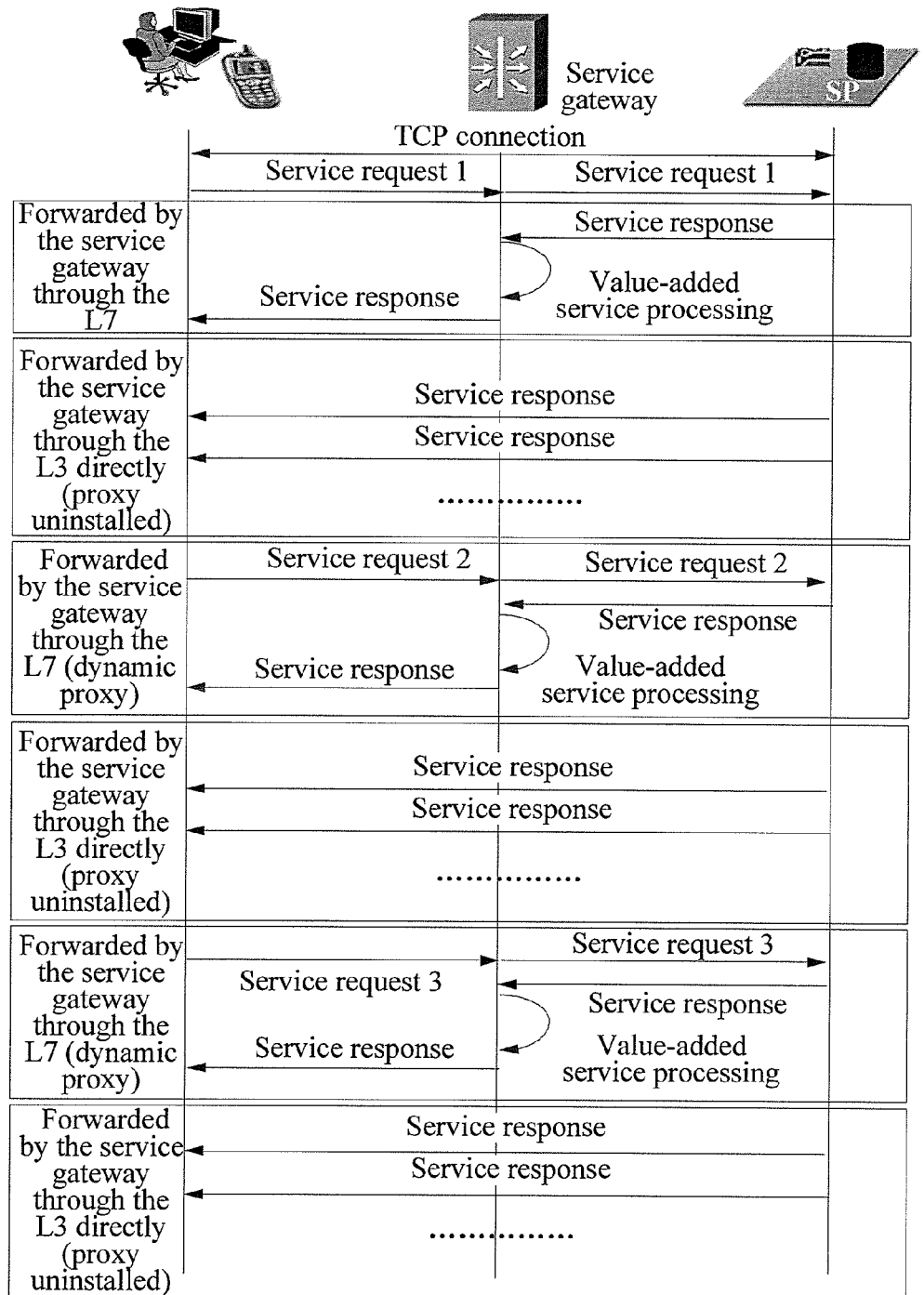
FIG. 13 is a schematic flow chart of a service 2 corresponding to dynamic insertion and uninstall of a TCP proxy according to an embodiment of the present invention.

FIG. 13 is a schematic flow chart of a service 2 corresponding to dynamic insertion and uninstall of a TCP proxy according to an embodiment of the present invention. Referring to FIG. 13, in a TCP interaction process, the proxy insertion or proxy uninstall process can be performed dynamically according to a service requirement, so as to improve performance.

Table 1 lists analysis data of a traffic model of the CISCO in 2010. It can be seen that, P2P, Email and WebTV account for over 60% of total traffic. Generally, only first packets of these services require value-added service processing. This patent may implement the proxy insertion or proxy uninstall process at any time without processing all packets through the L7, and single-stream performance may be improved by less than 60%.

Note: The data comes from the analysis data of the traffic model of the CISCO in 2010.

TABLE 1

| Protocol and Application | Traffic Ratio in the CISCO Model |
| --- | --- |
| OTT Web TV | 28.00% |
| Managed Web TV -VoD | 17.00% |
| Web/Email | 13.00% |
| OTT Live video | 6.00% |
| Gaming | 1.00% |
| P2P File sharing | 33.00% |
| Internet voice | 1.00% |
| Mobile Data | 1.00% |

Figure 14:
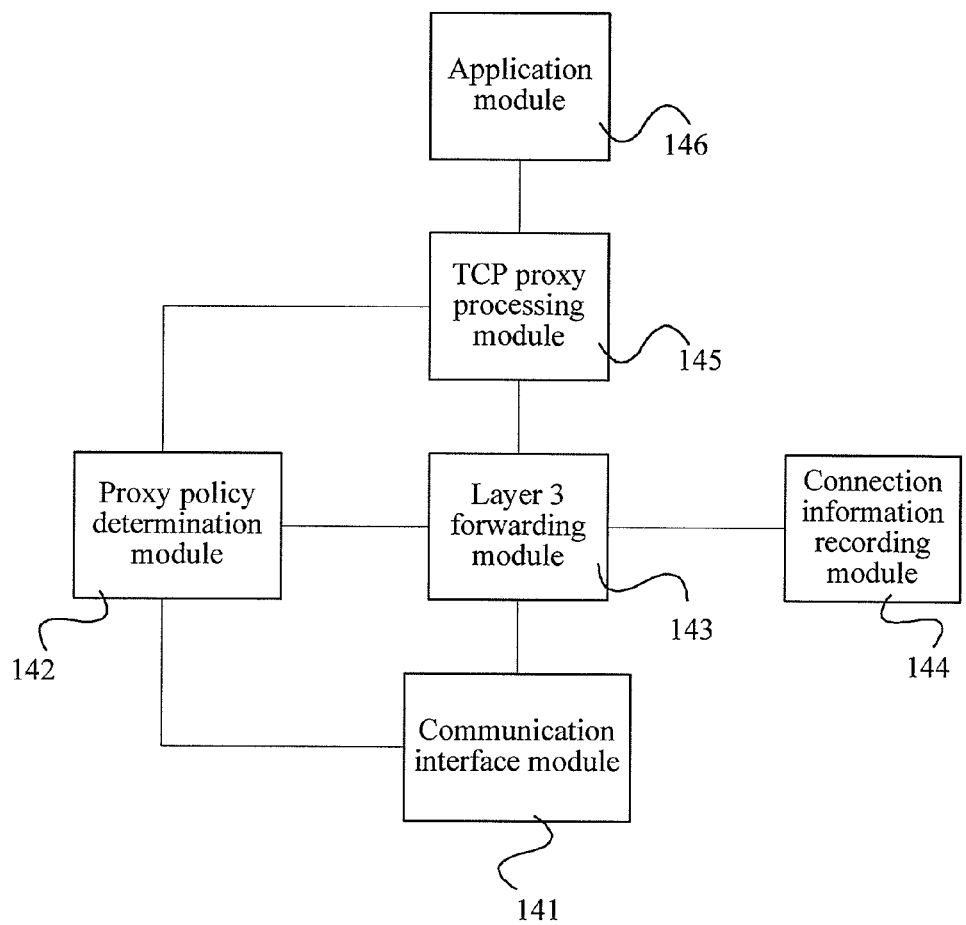
FIG. 14 is a schematic structural diagram of a service gateway device when a TCP proxy needs to be inserted dynamically according to an embodiment of the present invention.

FIG. 14 is a schematic structural diagram of a service gateway device when a TCP proxy needs to be dynamically inserted according to an embodiment of the present invention, where the device includes: a communication interface module 141, a proxy policy determination module 142, a layer 3 forwarding module 143, a connection information recording module 144, a TCP proxy processing module 145 and an application module 146. The communication interface module 141 is configured to receive a packet from a TCP client or a TCP server. The proxy policy determination module 142 is configured to determine according to a proxy policy whether the packet received by the communication interface module requires a TCP proxy process. The layer 3 forwarding module 143 is configured to forward, through an L3, the packet if it is determined by the proxy policy determination module that no proxy process is required for the received packet. The connection information recording module 144 is configured to, record option information and sequence number information of a TCP connection establishing packet, which is forwarded by the layer 3 forwarding module during establishment of a TCP connection, and update the recorded sequence number information according to sequence number information of a packet forwarded by the layer 3 forwarding module after the TCP connection is established. The TCP proxy processing module 145 is configured to generate a client pseudo socket and a server pseudo socket according to the option information and the sequence number information if it is determined by the proxy policy determination module that a TCP proxy process is required for the packet, and terminate the packet by adopting the client pseudo socket and the server pseudo socket. The application module 146 is configured to perform L7 processing on the terminated packet, and forward the processed packet.

The proxy policy determination module may be specifically configured to receive a proxy policy instructed by the application module.

When the recorded sequence number information is a packet sequence number of a packet expected to be received, the connection information recording module 144 is specifically configured to: if the packet sequence number of the received packet is larger than the currently recorded packet sequence number of the packet expected to be received, cache received packets until a packet sequence number of a received packet is equal to the currently recorded packet sequence number of the packet expected to be received, trigger the layer 3 forwarding module to forward the packet through the L3, and update the recorded packet sequence number to a packet sequence number of a next packet expected to be received in sequence; alternatively, if the packet sequence number of the received packet is smaller than the currently recorded packet sequence number of the packet expected to be received, trigger the layer 3 forwarding module to forward the packet through the L3, and keep the recorded packet sequence number unchanged; alternatively, if the packet sequence number of the received packet is equal to the currently recorded packet sequence number of the packet expected to be received, trigger the layer 3 forwarding module to forward the packet through the L3, and update the recorded packet sequence number to a packet sequence number of a next packet expected to be received in sequence.

When the recorded sequence number information is an ACK sequence number, the connection information recording module 144 is specifically configured to: update a recorded ACK sequence number to a largest ACK sequence number in the received packets.

The TCP proxy processing module 145 is specifically configured to: if it is determined by the proxy policy determination module that a TCP proxy process is required for the packets, use the recorded sequence number information as dividing lines for packets transmitted in both directions, and determine whether all data packets transmitted in both directions before the dividing lines are acknowledged; if all data packets transmitted in both directions before the dividing lines are acknowledged, generate a client pseudo socket and a server pseudo socket by adopting the option information, where the sequence number information includes packet sequence numbers of packets expected to be received, and the packet sequence numbers of the packets expected to be received include: a packet sequence number of a packet expected to be received in a direction from the TCP client to the TCP server and a packet sequence number of a packet expected to be received in a direction from the TCP server to the TCP client.

If the received packet is a data packet that includes an ACK flag, the layer 3 forwarding module 143 is further configured to: if an initial data sequence number of the packet is smaller than a packet sequence number corresponding to a dividing line in the same direction, and the packet includes data whose sequence number is larger than or equal to the packet sequence number corresponding to the dividing line in the same direction, delete the data whose sequence number is larger than or equal to the packet sequence number corresponding to the dividing line in the same direction from the packet, modify a length of the packet, and forward the packet to a peer end after recalculating a checksum, where if the received packet is from a TCP client, the peer end is a TCP server, and if the received packet is from a TCP server, the peer end is a TCP client; alternatively, if an initial data sequence number of the packet is larger than or equal to a packet sequence number corresponding to a dividing line in the same direction, delete data of the packet, modify a length of the packet, modify the packet sequence number of the packet to the packet sequence number corresponding to the dividing line in the same direction, and forward the packet to a peer end after recalculating a checksum, where if the received packet is from a TCP client, the peer end is a TCP server, and if the received packet is from a TCP server, the peer end is a TCP client; alternatively, if initial data sequence numbers of the packet are all smaller than a packet sequence number corresponding to a dividing line in the same direction, and the packet does not include data after the packet sequence number corresponding to the dividing line in the same direction, forward the packet to a peer end, where if the received packet is from a TCP client, the peer end is a TCP server, and if the received packet is from a TCP server, the peer end is a TCP client.

If the received packet is a pure ACK packet, the layer 3 forwarding module 143 is further configured to: transparently transmit the pure ACK packet to a peer end, where if the received packet is from a TCP client, the peer end is a TCP server, and if the received packet is from a TCP server, the peer end is a TCP client.

The sequence number information further includes ACK sequence numbers, and the connection information recording module 144 is further configured to: update the recorded ACK sequence number to a largest ACK sequence number in packets transmitted in both directions, where the ACK sequence numbers include: the ACK sequence number of a packet in the direction from the TCP client to the TCP server and the ACK sequence number of a packet in the direction from the TCP server to the TCP client. The TCP proxy processing module 145 is specifically configured to: if the recorded packet sequence number of the packet expected to be received in the direction from the TCP client to the TCP server is equal to the recorded ACK sequence number of the packet in the direction from the TCP server to the TCP client, and the recorded packet sequence number of the packet expected to be received in the direction from the TCP server to the TCP client is equal to the recorded ACK sequence number of the packet in the direction from the TCP client to the TCP server, determine that all data packets transmitted in both directions before the dividing lines are acknowledged.

In addition, it can be understood that, on the connection relationships of the foregoing modules, packets from an upper-layer module are transmitted through a lower-layer module. For example, packets from the L7 are transmitted through the L3, and packets from the L3 are transmitted through a communication interface.

With the embodiment, flexible proxy can be implemented by inserting a TCP proxy when a TCP proxy process is required, to avoid the problem of performance degradation resulted from a permanent proxy process, thereby improving system performance.

Figure 15:
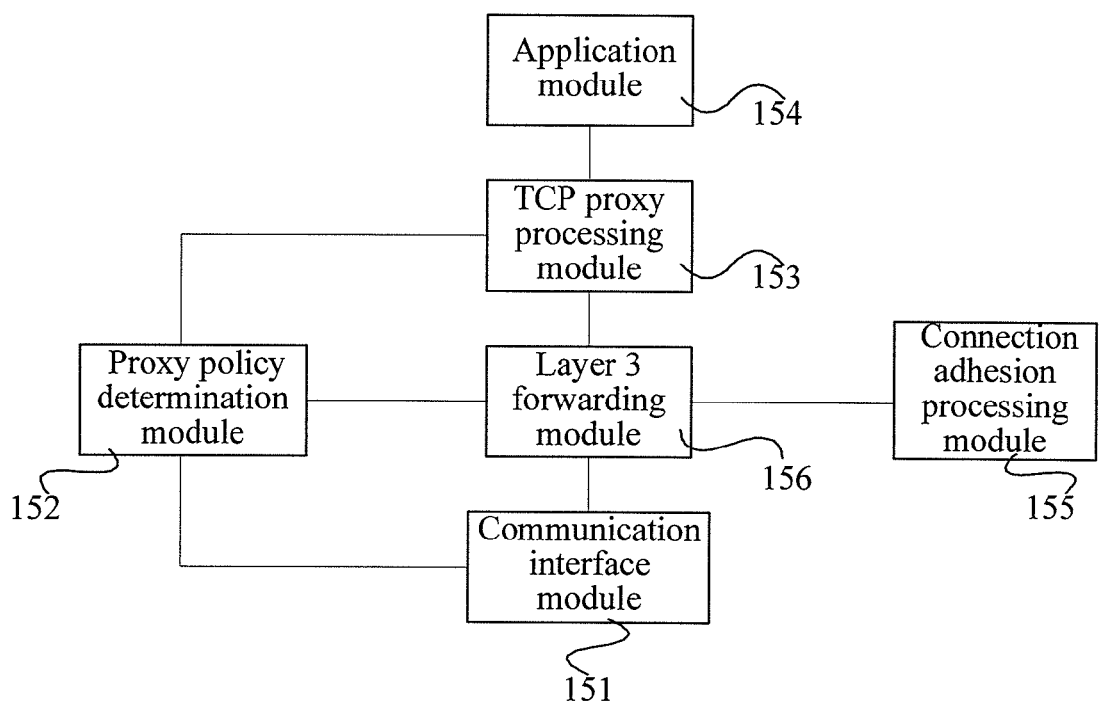
FIG. 15 is a schematic structural diagram of a service gateway device when a TCP proxy needs to be uninstalled dynamically according to an embodiment of the present invention.

FIG. 15 is a schematic structural diagram of a service gateway device when a TCP proxy needs to be dynamically uninstalled according to an embodiment of the present invention, where the device includes: a communication interface module 151, a proxy policy determination module 152, a TCP proxy processing module 153, an application module 154, a connection adhesion processing module 155 and a layer 3 forwarding module 156. The communication module 151 is configured to receive a packet from a TCP client or a TCP server. The proxy policy determination module 152 is configured to determine according to a proxy policy whether the packet received by the communication interface module requires a TCP proxy process. The TCP proxy processing module 153 is configured to, when the proxy policy determination module determines that a TCP proxy process is required, generate a client pseudo socket and a server pseudo socket, and perform termination processing on the received packet. The application module 154 is configured to perform L7 processing on the packet terminated by the TCP proxy processing module and forward the processed packet. The TCP proxy processing module 153 is further configured to, after the proxy policy determination module determines that no proxy process is required according to the proxy policy, instruct the TCP client and the TCP server to suspend sending packets, send cached packets to each of the TCP client and the TCP server and generate adhesion information. The connection adhesion processing module 155 is configured to perform, according to the adhesion information, sequence number correction processing on packets retransmitted by the TCP client and the TCP server after the suspension of packet sending is over, so that a difference between a corrected sequence number and a sequence number before correction is equal to a difference between a sequence number of a last sent packet and a sequence number of a packet expected to be received, where the sequence number of the last sent packet and the sequence number of the packet expected to be received are included in the adhesion information. The layer 3 forwarding module 156 is configured to forward, through an L3, the packets processed by the connection adhesion processing module.

The proxy policy determination module may be specifically configured to receive a proxy policy instructed by the application module.

The TCP proxy processing module 153 is specifically configured to: simulate a TCP server to send a notification indicating that a receiver window is 0 to a corresponding TCP client, so that the TCP client sets a value of a window field of a packet to 0, and sends no packet to the service gateway device within a certain time period; and send cached packets to the TCP server. Alternatively, the TCP proxy processing module 153 is specifically configured to: simulate a TCP client to send a notification indicating that a receiver window is 0 to a corresponding TCP server, so that the TCP server sets a value of a window field of a packet to 0, and sends no packet to the service gateway device within a certain time period; and send cached packets to the TCP client.

The adhesion information includes: a packet sequence number and an ACK sequence number of a last packet sent in a direction from the TCP client to the TCP server, and a packet sequence number and an ACK sequence number of a packet expected to be received in the direction from the TCP client to the TCP server, where the packet sequence numbers and ACK sequence numbers are recorded by the client pseudo socket; and a packet sequence number and an ACK sequence number of a last packet sent in a direction from the TCP server to the TCP client and a packet sequence number and an ACK sequence number of a packet expected to be received in the direction from the TCP server to the TCP client, where the packet sequence numbers and ACK sequence numbers are recorded by the server pseudo socket. The connection adhesion processing module 155 is specifically configured to: correct the packet sequence number and the ACK sequence number of the packet in the direction from the TCP client to the TCP server, so that a difference between the corrected packet sequence number and a packet sequence number before correction is equal to a difference between the packet sequence number of the last sent packet recorded by the pseudo TCP client and the packet sequence number of the packet expected to be received recorded by the pseudo TCP server, and that a difference between the corrected ACK sequence number and an ACK sequence number before correction is equal to a difference between the ACK sequence number of the last sent packet recorded by the pseudo TCP client and the ACK sequence number of the packet expected to be received recorded by the pseudo TCP server; and correct the packet sequence number and the ACK sequence number of the packet in the direction from the TCP server to the TCP client, so that a difference between the corrected packet sequence number and a packet sequence number before correction is equal to a difference between the packet sequence number of the last sent packet recorded by the pseudo TCP server and the packet sequence number of the packet expected to be received recorded by the pseudo TCP client, and that a difference between the corrected ACK sequence number and an ACK sequence number before correction is equal to a difference between the ACK sequence number of the last sent packet recorded by the pseudo TCP server and the ACK sequence number of the packet expected to be received recorded by the pseudo TCP client.

In addition, it can be understood that, on the connection relationships of the foregoing modules, packets from an upper-layer module are transmitted through a lower-layer module. For example, packets from the L7 are transmitted through the L3, and packets from the L3 are transmitted through a communication interface.

In the embodiment, a TCP proxy uninstall process is performed when the TCP proxy process is not required, to avoid the problem resulted from a permanent TCP proxy process, thereby improving system performance.

Persons of ordinary skill in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk, or a compact disk.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that modifications can be made to the technical solutions described in the foregoing embodiments or substitutions can be made to some technical features thereof, as long as such modifications or substitutions cannot make the essence of the corresponding technical solutions depart from the idea and scope of the technical solutions of the embodiments of the present invention.

What is claimed is:

1. A TCP proxy insertion method, comprising:
   during establishment of a TCP connection, forwarding a TCP connection establishing packet between a TCP client and a TCP server through an L3, and recording option information and sequence number information of the TCP connection establishing packet;
   performing proxy determination on a received packet according to a proxy policy after the TCP connection is established;
   if it is determined that no proxy process is required for the received packet according to the proxy policy, forwarding the received packet through the L3, and updating the recorded sequence number information according to sequence number information of the received packet;
   if it is determined that a proxy process is required for the received packet according to the proxy policy, generating a client pseudo socket and a server pseudo socket according to the recorded option information and sequence number information, terminating the received packet by adopting the client pseudo socket and the server pseudo socket, processing the terminated packet through an L7 and forwarding the processed packet.

2. The method according to claim 1, wherein the recorded sequence number information is a packet sequence number of a packet expected to be received, and the forwarding the received packet through the L3, and updating the recorded sequence number information according to the sequence number information of the received packet comprises:

if a packet sequence number of the received packet is larger than a currently recorded packet sequence number of the packet expected to be received, caching packets until a packet sequence number of a subsequent received packet is equal to the currently recorded packet sequence number of the packet expected to be received, performing L3 forwarding on the received packet, and updating the recorded packet sequence number to a packet sequence number of a next packet expected to be received in sequence;

or, if a packet sequence number of the received packet is smaller than a currently recorded packet sequence number of the packet expected to be received, forwarding the packet through the L3 and keeping the recorded packet sequence number unchanged;

or, if a packet sequence number of the received packet is equal to a currently recorded packet sequence number of the packet expected to be received, forwarding the packet through the L3 and updating the recorded packet sequence number to a packet sequence number of a next packet expected to be received in sequence.

3. The method according to claim 1, wherein the recorded sequence number information is an ACK sequence number, and the forwarding the received packet through the L3, and updating the recorded sequence number information according to the sequence number information of the received packet comprises:

forwarding the packet through the L3, and updating the recorded ACK sequence number to a largest ACK sequence number in received packets.

4. The method according to claim 1, wherein the generating the client pseudo socket and the server pseudo socket according to the recorded option information and sequence number information comprises:

according to the recorded sequence number information, determining dividing lines for packets transmitted in both directions, and determining whether all data packets transmitted in both directions before the dividing lines are acknowledged;

if all the data packets transmitted in both directions before the dividing lines are acknowledged, generating the client pseudo socket and the server pseudo socket by adopting the option information.

5. The method according to claim 4, wherein the recorded sequence number information comprises recorded packet sequence numbers of packets expected to be received, and the determining the dividing lines for the packets transmitted in both directions according to the recorded sequence number information comprises:

using the packet sequence numbers of the packets expected to be received as the dividing lines, wherein the packet sequence numbers of the packets expected to be received comprise: a packet sequence number of a packet expected to be received in a direction from a TCP client to a TCP server and a packet sequence number of a packet expected to be received in a direction from the TCP server to the TCP client.

6. The method according to claim 5, wherein if the packets transmitted in both directions are data packets that comprise ACK flags, the method further comprises:

if an initial data sequence number of a data packet is smaller than a packet sequence number corresponding to a dividing line in a same direction, and the data packet comprises data whose sequence number is larger than or equal to the packet sequence number corresponding to the dividing line in the same direction, deleting the data whose sequence number is larger than or equal to the packet sequence number corresponding to the dividing line in the same direction from the data packet, modifying a length of the packet, and forwarding the packet to a peer end after recalculating a checksum, wherein if the received packet is from a TCP client, the peer end is a TCP server, and if the received packet is from a TCP server, the peer end is a TCP client;

or, if an initial data sequence number of a data packet is larger than or equal to a packet sequence number corresponding to a dividing line in a same direction, deleting data of the data packet, modifying a length of the packet, modifying a packet sequence number of the data packet to the packet sequence number corresponding to the dividing line in the same direction, and forwarding the packet to a peer end after recalculating a checksum, wherein if the received packet is from a TCP client, the peer end is a TCP server, and if the received packet is from a TCP server, the peer end is a TCP client;

or, if all initial data sequence numbers of a data packet are smaller than a packet sequence number corresponding to a dividing line in a same direction, and the data packet does not comprise data after the packet sequence number corresponding to the dividing line in the same direction, forwarding the data packet to a peer end, wherein if the received packet is from a TCP client, the peer end is a TCP server, and if the received packet is from a TCP server, the peer end is a TCP client.

7. The method according to claim 5, wherein if the packets transmitted in both directions are pure ACK packets, the method further comprises:

transparently transmitting the pure ACK packets to a peer end, wherein if the received packet is from a TCP client, the peer end is a TCP server; if the received packet is from a TCP server, the peer end is a TCP client.

8. The method according to claim 5, wherein the recorded sequence number information further comprises ACK sequence numbers, and the method further comprises:

updating the recorded ACK sequence numbers to largest ACK sequence numbers of the packets transmitted in both directions, wherein the ACK sequence numbers comprise: an ACK sequence number of a packet in the direction from the TCP client to the TCP server and an ACK sequence number of a packet in the direction from the TCP server to the TCP client; and the determining whether all the data packets transmitted in both directions before the dividing lines are acknowledged comprises: if the recorded packet sequence number of the packet expected to be received in the direction from the TCP client to the TCP server is equal to the recorded ACK sequence number of the packet in the direction from the TCP server to the TCP client, and the recorded packet sequence number of the packet expected to be received in the direction from the TCP server to the TCP client is equal to the recorded ACK sequence number of the packet in the direction from the TCP client the TCP server, determining that all the data packets transmitted in both directions before the dividing lines are acknowledged.

9. A TCP proxy uninstall method, comprising:

processing and forwarding packets between a TCP client and a TCP server through an L7 by adopting a TCP proxy process;

after it is determined that no proxy process is required according to a proxy policy, instructing the TCP client and the TCP server to suspend sending packets, sending packets cached by a TCP proxy to each of the TCP client and the TCP server, and generating adhesion information; and performing, according to the adhesion information, sequence number correction processing on packets retransmitted by the TCP client and the TCP server after the suspension of packet sending is over, so that a difference between a corrected sequence number and a sequence number before correction is equal to a difference between a sequence number of a last sent packet and a sequence number of a packet expected to be received, wherein the sequence number of the last sent packet and the sequence number of the packet expected to be received are comprised in the adhesion information; and forwarding the processed packets through the L3.

10. The method according to claim 9, wherein the instructing the TCP client and the TCP server to suspend sending the packets, and sending the packets cached by the TCP proxy to each of the TCP client and the TCP server comprise:

simulating the TCP server to send a notification indicating that a receiver window is 0 to the corresponding TCP client, so that the TCP client sets a value of a window field of a packet to 0, and sends no packet to the service gateway device within a certain time period; or, simulating the TCP client to send a notification indicating that a receiver window is 0 to the corresponding TCP server, so that the TCP server sets a value of a window field of a packet to 0, and sends no packet to the service gateway device within a certain time period;

sending the packets cached by the TCP proxy to each of the TCP client and the TCP server.

11. The method according to claim 9, wherein the adhesion information comprises: a packet sequence number and an ACK sequence number of a last packet sent in a direction from the TCP client to the TCP server, and a packet sequence number and an ACK sequence number of a packet expected to be received in the direction from the TCP client to the TCP server, wherein the packet sequence numbers and ACK sequence numbers are recorded by a client pseudo socket; a packet sequence number and an ACK sequence number of a last packet sent in a direction from the TCP server to the TCP client, and a packet sequence number and an ACK sequence number of a packet expected to be received in the direction from the TCP server to the TCP client, wherein the packet sequence numbers and ACK sequence numbers are recorded by a server pseudo socket; and the performing, according to the adhesion information, the sequence number correction processing on the packets retransmitted by the TCP client and the TCP server after the suspension of packet sending is over comprises:

correcting the packet sequence number and the ACK sequence number of the packet in the direction from the TCP client to the TCP server, so that a difference between the corrected packet sequence number and a packet sequence number before correction is equal to a difference between a packet sequence number of a last sent packet recorded by a pseudo TCP client and a packet sequence number of a packet expected to be received recorded by a pseudo TCP server, and that a difference between the corrected ACK sequence number and an ACK sequence number before correction is equal to a difference between an ACK sequence number of the last sent packet recorded by the pseudo TCP client and an ACK sequence number of the packet expected to be received recorded by the pseudo TCP server;

correcting the packet sequence number and the ACK sequence number of the packet in the direction from the TCP server to the TCP client, so that a difference between the corrected packet sequence number and a packet sequence number before correction is equal to a difference between the packet sequence number of the last sent packet recorded by the pseudo TCP server and the packet sequence number of the packet expected to be received recorded by the pseudo TCP client, and that a difference between the corrected ACK sequence number and an ACK sequence number before correction is equal to a difference between the ACK sequence number of the last sent packet recorded by the pseudo TCP server and the ACK sequence number of the packet expected to be received recorded by the pseudo TCP client.

12. A service gateway device, comprising:

a communication interface module, configured to receive a packet from a TCP client or a TCP server;

a proxy policy determination module, configured to determine whether the packet received by the communication interface module requires a TCP proxy process according to a proxy policy;

a layer 3 forwarding module, configured to forward, through an L3, the packet if it is determined by the proxy policy determination module that no TCP proxy process is required for the packet;

a connection information recording module, configured to, if the packet is a TCP connection establishing packet forwarded by the layer 3 forwarding module during establishment of a TCP connection, record option information and sequence number information of the TCP connection establishing packet, and if the packet is a packet forwarded by the layer 3 forwarding module after the TCP connection is established, update the recorded sequence number information according to sequence number information of the packet after the TCP connection is established;

a TCP proxy processing module, configured to generate a client pseudo socket and a server pseudo socket according to the recorded option information and sequence number information if it is determined by the proxy policy determination module that a TCP proxy process is required for the packet, and terminate the packet by adopting the client pseudo socket and the server pseudo socket; and an application module, configured to perform L7 processing on the terminated packet, and forward the processed packet.

13. The device according to claim 12, wherein the recorded sequence number information is a packet sequence number of a packet expected to be received, and the connection information recording module is configured to:

if a packet sequence number of the received packet is larger than a currently recorded packet sequence number of the packet expected to be received, cache received packets until a packet sequence number of a received packet is equal to the currently recorded packet sequence number of the packet expected to be received, trigger the layer 3 forwarding module to forward the packets through the L3, and update the recorded packet sequence number to a packet sequence number of a next packet expected to be received in sequence;

or,
    if a packet sequence number of the received packet is smaller than a currently recorded packet sequence number of the packet expected to be received, trigger the layer 3 forwarding module to forward the packet and keep the recorded packet sequence number unchanged;

or,
    if a packet sequence number of the received packet is equal to a currently recorded packet sequence number of the packet expected to be received, trigger the layer 3 forwarding module to forward the packet and update the recorded packet sequence number to a packet sequence number of a next packet expected to be received in sequence.

14. The device according to claim 12, wherein the recorded sequence number information is an ACK sequence number, and the connection information recording module is configured to:
    update the recorded ACK sequence number to a largest ACK sequence number in received packets.

15. The device according to claim 12, wherein the TCP proxy processing module is configured to:
    if it is determined by the proxy policy determination module that the TCP proxy process is required for the packet, use the recorded sequence number information as dividing lines of packets transmitted in both directions, and determine whether all data packets transmitted in both directions before the dividing lines are acknowledged; and if all the data packets transmitted in both directions before the dividing lines are acknowledged, generate a client pseudo socket and a server pseudo socket by adopting the option information, wherein
    the sequence number information comprises packet sequence numbers of packets expected to be received, and the packet sequence numbers of the packets expected to be received comprise: a packet sequence number of a packet expected to be received in a direction from a TCP client to a TCP server and a packet sequence number of a packet expected to be received in a direction from the TCP server to the TCP client.

16. The device according to claim 15, wherein if the packets transmitted in both directions are data packets that comprise ACK flags, the layer 3 forwarding module is further configured to:
    if an initial data sequence number of a packet is smaller than a packet sequence number corresponding to a dividing line in a same direction, and the packet comprises data whose sequence number is larger than or equal to the packet sequence number corresponding to the dividing line in the same direction, delete the data whose sequence number is larger than or equal to the packet sequence number corresponding to the dividing line in the same direction from the packet, modify a length of the packet, and forwarding the packet to a peer end after recalculating a checksum, wherein if the received packet is from a TCP client, the peer end is a TCP server, and if the received packet is from a TCP server, the peer end is a TCP client;

or,
    if an initial data sequence number of a packet is larger than or equal to a packet sequence number corresponding to a dividing line in a same direction, delete data of the packet, modify a length of the packet, modify a packet sequence number of the packet to the packet sequence number corresponding to the dividing line in the same direction, and forward the packet to a peer end after recalculating a checksum, wherein if the received packet is from a TCP client, the peer end is a TCP server, and if the received packet is from a TCP server, the peer end is a TCP client;

or,
    if an initial data sequence number of a packet is smaller than a packet sequence number corresponding to a dividing line in a same direction, and the packet does not comprise data after the packet sequence number corresponding to the dividing line in the same direction, forward the packet to a peer end, wherein if the received packet is from a TCP client, the peer end is a TCP server, and if the received packet is from a TCP server, the peer end is a TCP client.

17. The device according to claim 15, wherein if the packets transmitted in both directions are pure ACK packets, the layer 3 forwarding module is further configured to: transparently transmit the pure ACK packets to a peer end, wherein if the received packet is from a TCP client, the peer end is a TCP server; if the received packet is received from a TCP server, the peer end is a TCP client.

18. The device according to claim 15, wherein the recorded sequence number information further comprises ACK sequence numbers, and the connection information recording module is further configured to:
    update the recorded ACK sequence numbers to largest ACK sequence numbers of the packets transmitted in both directions, wherein the ACK sequence numbers comprise: an ACK sequence number of a packet in the direction from the TCP client to the TCP server and an ACK sequence number of a packet in the direction from the TCP server to the TCP client; and
    the TCP proxy processing module is configured to: if the recorded packet sequence number of the packet expected to be received in the direction from the TCP client to the TCP server is equal to the recorded ACK sequence number of the packet in the direction from the TCP server the TCP client, and the recorded packet sequence number of the packet expected to be received in the direction from the TCP server to the TCP client is equal to the recorded ACK sequence number of the packet in the direction from the TCP client the TCP server, determine that all the data packets transmitted in both directions before the dividing lines are acknowledged.

19. A service gateway device, comprising:
    a communication interface module, configured to receive a packet from a TCP client or a TCP server;
    a proxy policy determination module, configured to determine whether the packet received by the communication interface module requires a TCP proxy process according to a proxy policy;
    a TCP proxy processing module, configured to generate a client pseudo socket and a server pseudo socket when the proxy policy determination module determines that a TCP proxy process is required, and perform termination processing on the received packet;
    an application module, configured to perform L7 processing on the packet terminated by the TCP proxy processing module and then forward the processed packet, wherein
    the TCP proxy processing module is further configured to instruct the TCP client and the TCP server to suspend sending packets after the proxy policy determination module determines that no proxy process is required according to the proxy policy, send cached packets to each of the TCP client and the TCP server, and generate adhesion information;

a connection adhesion processing module, configured to perform, according to the adhesion information, sequence number correction processing on packets retransmitted by the TCP client and the TCP server after the suspension of packet sending is over, so that a difference between a corrected sequence number and a sequence number before correction is equal to a difference between a sequence number of a last sent packet and a sequence number of a packet expected to be received, wherein the sequence number of the last sent packet and the sequence number of the packet expected to be received are comprised in the adhesion information; and a layer 3 forwarding module, configured to forward, through an L3, the packets processed by the connection adhesion processing module.

20. The device according to claim 19, wherein the TCP proxy processing module is configured to:

simulate the TCP server to send a notification indicating that a receiver window is 0 to the corresponding TCP client, so that the TCP client sets a value of a window field of a packet to 0, and sends no packet to the service gateway device within a certain time period; or simulate the TCP client to send a notification indicating that a receiver window is 0 to the corresponding TCP server, so that the TCP server sets a value of a window field of a packet to 0, and sends no packet to the service gateway device within a certain time period; and send the cached packets to each of the TCP client and the TCP server.

21. The device according to claim 19, wherein the adhesion information comprises: a packet sequence number and an ACK sequence number of a last packet sent in a direction from the TCP client to the TCP server, and a packet sequence number and an ACK sequence number of a packet expected to be received in the direction from the TCP client to the TCP server, wherein the packet sequence numbers and ACK sequence numbers are recorded by the client pseudo socket; a packet sequence number and an ACK sequence number of a last packet sent in a direction from the TCP server to the TCP client, and a packet sequence number and an ACK sequence number of a packet expected to be received in the direction from the TCP server to the TCP client, wherein the packet sequence numbers and ACK sequence numbers are recorded by the server pseudo socket; and the connection adhesion information processing module is configured to:

correct the packet sequence number and the ACK sequence number of the packet in the direction from the TCP client to the TCP server, so that a difference between the corrected packet sequence number and a packet sequence number before correction is equal to a difference between a packet sequence number of a last sent packet recorded by a pseudo TCP client and a packet sequence number of a packet expected to be received recorded by a pseudo TCP server, and that a difference between the corrected ACK sequence number and an ACK sequence number before correction is equal to a difference between an ACK sequence number of the last sent packet recorded by the pseudo TCP client and an ACK sequence number of the packet expected to be received recorded by the pseudo TCP server; and correct the packet sequence number and the ACK sequence number of the packet in the direction from the TCP server to the TCP client, so that a difference between the corrected packet sequence number and a packet sequence number before correction is equal to a difference between the packet sequence number of the last sent packet recorded by the pseudo TCP server and the packet sequence number of the packet expected to be received recorded by the pseudo TCP client, and that a difference between the corrected ACK sequence number and an ACK sequence number before correction is equal to a difference between the ACK sequence number of the last sent packet recorded by the pseudo TCP server, and the ACK sequence number of the packet expected to be received recorded by the pseudo TCP client.

* * * * *